United States Patent
Brown et al.

(10) Patent No.: US 11,048,608 B2
(45) Date of Patent: Jun. 29, 2021

(54) PROBABILITY-DISTRIBUTION-BASED LOG-FILE ANALYSIS

(71) Applicant: VMware, Inc., Palo Alto, CA (US)

(72) Inventors: Darren Brown, Seattle, WA (US); Nicholas Kushmerick, Seattle, WA (US); Junyuan Lin, Seattle, WA (US); Matt Roy McLaughlin, Seattle, WA (US); Jon Herlocker, Seattle, WA (US)

(73) Assignee: VMware, Inc., Palo Alto, CA (US)

( * ) Notice: Subject to any disclaimer, the term of this patent is extended or adjusted under 35 U.S.C. 154(b) by 1097 days.

(21) Appl. No.: 14/660,461

(22) Filed: Mar. 17, 2015

(65) Prior Publication Data
US 2016/0277268 A1  Sep. 22, 2016

(51) Int. Cl.
| G06F 11/34 | (2006.01) |
| G06F 11/07 | (2006.01) |
| G06F 11/30 | (2006.01) |
| H04L 29/08 | (2006.01) |
| G06F 17/40 | (2006.01) |

(52) U.S. Cl.
CPC ...... *G06F 11/3452* (2013.01); *G06F 11/0778* (2013.01); *G06F 11/0781* (2013.01); *G06F 11/3072* (2013.01); *G06F 11/3075* (2013.01); *G06F 11/3476* (2013.01); *G06F 17/40* (2013.01); *H04L 67/10* (2013.01)

(58) Field of Classification Search
CPC .. G06F 11/0709; G06F 11/076; G06F 11/079; G06F 11/0781; G06F 11/0778; G06F 11/3476; G06F 11/3072; G06F 11/3075; G06F 11/3452; H04L 41/142; H04L 43/04
See application file for complete search history.

(56) References Cited

U.S. PATENT DOCUMENTS

| 2008/0033971 A1* | 2/2008 | Carmel | G06F 17/30675 |
| 2009/0006176 A1* | 1/2009 | Handley | G06Q 10/0639 705/7.32 |
| 2011/0196872 A1* | 8/2011 | Sims | G06F 17/30985 707/740 |
| 2011/0302124 A1* | 12/2011 | Cai | G06F 17/30707 706/52 |
| 2013/0080367 A1* | 3/2013 | Tonouchi | G06N 5/02 706/46 |
| 2015/0301882 A1* | 10/2015 | Liao | G05B 19/4184 714/47.3 |
| 2016/0277268 A1* | 9/2016 | Brown | H04L 67/10 |

* cited by examiner

*Primary Examiner* — Gregory G Todd

(57) ABSTRACT

The current document is directed to systems, and methods incorporated within the systems, that carry out probability-distribution-based analysis of log-file entries. A monitoring subsystem within a distributed computer system uses probability-distribution-based analysis of log-file entries to detect changes in the state of the distributed computer system. A log-file-analysis subsystem within a distributed computer system uses probability-distribution-based analysis of log-file entries to identify subsets of log-file entries that predict anomalies and impending problems in the distributed computer system. In many implementations, a numerical comparison of probability distributions of log-file-entry types is used to detect state changes in the distributed computer system.

9 Claims, 34 Drawing Sheets

```
2013-12-02T10:44:24.095Z li-qe-esx5.vmware.com Rhttpproxy:
[28959B90 verbose 'Proxy Req 46691'] Connected to
localhost:8307 ──── 1212           ── 1206
```

```
2013-12-02T10:44:24.094Z li-qe-esx5.vmware.com Rhttpproxy:
[FFFC2B90 verbose 'Proxy Req 46691'] new proxy client
TCP (local-127.0.0.1:80, peer=127.0.0.1:50155)
```

```
2013-12-02T10:44:24.093Z li-qe-esx5.vmware.com Rhttpproxy:
[2889B90 verbose 'Proxy Req 46685'] The client closed the
stream, not unexpectedly.
```

```
Dec  2 18:48:29 strata-vc 2013-12-02T18:48:30.273Z
[7FA39448B700 info 'commonvpxLro' opID=1947d6f9]  [VpxLRO] -
FINISH task-internal-2163522 -- -- vim.SessionManager.logout -
```

```
2013-12-02T18:48:51.396Z strata-esx1.eng.vmware.com Vpxa:
[65B5AB90 verbose 'VpxaHalCnxHostagent' opID=WFU-ed393333]
[WaitForUpdatesDone] Completed callback
```

```
2013-12-02T18:48:51.395Z strata-esx1.eng.vmware.com Vpxa:
[65B5AB90 verbose 'VpxaHalCnxHostagent' opID=WFU-ed393333]
[WaitForUpdatesDone] Starting next WaitForUpdates() call to
hostd
```

```
2013-12-02T18:48:51.395Z strata-esx1.eng.vmware.com Vpxa:
[65B5AB90 verbose 'vpxavpxaInvtVm' opID=WFU-ed393333]
[VpxaInvtVmChangeListener] Guest DiskInfo Changed
```

```
2013-12-02T18:48:51.395Z strata-esx1.eng.vmware.com Vpxa:
[65B5AB90 verbose 'halservices' opID=WFU-ed393333]
[VpxaHalServices] VMGuestDiskChange Event for vm(6) 59
```

```
2013-12-02T18:48:51.395Z strata-esx1.eng.vmware.com Vpxa:
[65B5AB90 verbose 'hostdvm' opID=WFU-ed393333]
[VpxaHalVmHostagent] 59: GuestInfo changed 'guest.disk'
```

```
2013-12-02T18:48:51.395Z strata-esx1.eng.vmware.com Vpxa:
[65B5AB90 verbose 'VpxaHalCnxHostagent' opID=WFU-ed393333]
[VpxaHalCnxHostagent::ProcessUpdate] Applying updates from
123718 to 123719 (at 123718)
```

```
2013-12-02T18:48:51.395Z strata-esx1.eng.vmware.com Vpxa:
[65B5AB90 verbose 'VpxaHalCnxHostagent' opID=WFU-ed393333]
[WaitForUpdatesDone] Received callback
2013-12-02T18:48:51.360Z li-dev-esx6.eng.vmware.com Hostd:
[617C1B90 error 'SoapAdapter.HTTPService'] HTTP Transaction
```

$$D_{KL}(P\|Q) = \sum P(i)\log\frac{P(i)}{Q(i)} \qquad D_{KL}(Q\|P) = \sum Q(i)\log\frac{Q(i)}{P(i)}$$

1902

| $P_1$ | .041 | .041 | .033 | .09 | .016 | .041 | .041 | .1 | .066 | .09 | .033 | .049 | .033 | .008 | .041 | .016 | .1 | .09 | .057 | |
|---|---|---|---|---|---|---|---|---|---|---|---|---|---|---|---|---|---|---|---|---|
| $Q_1$ | .023 | .039 | .023 | .085 | .008 | .039 | .023 | .11 | .031 | .124 | .039 | .039 | .062 | .008 | .054 | .008 | .1 | .116 | .062 | |
| P/Q | 1.78 | 1.05 | 1.44 | 1.06 | 2 | 1.05 | 1.78 | .909 | 2.13 | .726 | .896 | 1.26 | .532 | 1 | .759 | 2 | 1 | .78 | .919 | |
| log P/Q | .251 | .022 | .157 | .025 | .301 | .022 | .251 | -.041 | .328 | -.139 | -.073 | .099 | -.274 | 0 | -.12 | .301 | 0 | -.11 | -.036 | Σ = .035 — 1912 |
| Plog P/Q | .010 | .001 | .005 | .002 | .005 | .001 | .010 | -.004 | .022 | -.013 | -.002 | .005 | -.009 | 0 | -.005 | .005 | 0 | -.001 | -.002 | |

1906 ⎫ 1908 ⎭

1903

| $P_2$ | .017 | .087 | .064 | .017 | .04 | .07 | .046 | .07 | .08 | .006 | .006 | .017 | .04 | .058 | .087 | .017 | .087 | .035 | .087 | |
|---|---|---|---|---|---|---|---|---|---|---|---|---|---|---|---|---|---|---|---|---|
| $Q_2$ | .048 | .03 | .015 | .112 | .112 | .037 | .048 | .015 | .008 | .097 | .048 | .112 | .022 | .03 | .015 | .03 | .03 | .097 | .015 | |
| P/Q | 1.46 | 2.9 | 4.23 | .152 | .357 | 1.89 | .959 | 4.67 | 10 | .062 | .125 | .152 | 7.82 | 1.93 | 5.8 | .152 | 2.9 | .361 | 5.8 | |
| log P/Q | .164 | .462 | .63 | -.819 | -.447 | .277 | .018 | .67 | 1 | -1.21 | -.903 | -.819 | .26 | .286 | .763 | -.819 | .462 | -.443 | .763 | 1914 Σ = .368 |
| Plog P/Q | .003 | .04 | .04 | -.014 | -.018 | .019 | .001 | .047 | .08 | -.007 | -.005 | -.014 | .01 | .017 | .067 | -.014 | -.016 | .066 | | |

1910

1904

| $Q_1$ | .023 | .039 | .023 | .085 | .008 | .039 | .023 | .11 | .031 | .124 | .09 | .033 | .062 | .008 | .054 | .008 | .1 | .116 | .062 | |
|---|---|---|---|---|---|---|---|---|---|---|---|---|---|---|---|---|---|---|---|---|
| $P_1$ | .041 | .041 | .033 | .09 | .016 | .041 | .041 | .1 | .066 | .09 | .033 | .049 | .033 | .008 | .041 | .016 | .1 | .09 | .057 | |
| P/Q | .56 | .951 | .697 | .944 | .5 | .951 | .56 | 1.1 | .47 | 1.38 | 1.18 | .8 | 1.88 | 1 | 1.32 | .5 | 1 | 1.29 | 1.09 | |
| log P/Q | -.251 | -.022 | -.157 | -.025 | -.301 | -.022 | -.251 | .041 | -.328 | .139 | .073 | -.099 | .274 | 0 | .12 | -.301 | 0 | .11 | .036 | Σ = .024 — 1916 |
| Plog P/Q | -.006 | -.001 | -.004 | -.002 | -.002 | -.001 | -.006 | .005 | -.01 | .017 | .003 | -.003 | .017 | 0 | .006 | -.002 | 0 | .013 | .002 | |

1905

| $Q_2$ | .048 | .03 | .015 | .112 | .112 | .037 | .048 | .015 | .08 | .006 | .048 | .112 | .022 | .03 | .015 | .03 | .03 | .097 | .015 | |
|---|---|---|---|---|---|---|---|---|---|---|---|---|---|---|---|---|---|---|---|---|
| $P_2$ | .017 | .087 | .064 | .017 | .04 | .07 | .046 | .07 | .08 | .006 | .006 | .017 | .04 | .058 | .087 | .017 | .087 | .035 | .087 | |
| P/Q | .686 | .345 | .234 | 6.59 | 2.8 | .529 | 1.04 | .214 | .1 | 16.2 | 8 | 6.59 | .550 | .517 | .172 | 6.59 | .345 | 2.77 | .192 | |
| log P/Q | -.164 | -.462 | -.63 | .819 | .447 | -.277 | -.018 | -.67 | -1 | 1.21 | .903 | .819 | -.26 | -.286 | -.783 | .819 | -.462 | .443 | -.763 | Σ = .407 — 1918 |
| Plog P/Q | -.008 | -.014 | -.009 | .092 | .05 | -.01 | -.001 | -.01 | -.008 | .117 | .043 | .092 | -.006 | -.009 | -.011 | .092 | -.014 | .043 | -.011 | |

```
1  #include <math.h>
1920  2  #include <stdio.h>
3  #include <tchar.h>
4
1921  5  const long double two = 2;
6  const long double oneoverln2 = 1 / log(two);
7
8  typedef struct
9  {
1922  10    double index;
11    long double value;
12  } D_Element;
13
1921  14
15  typedef D_Element* ePtr;
16
17  class distribution;
18
19  class distribution
20  {
21    private:
22          int num;
23          ePtr nxt;
24          ePtr elements;
25
1925  26    public:
27          int getNum(){return num;};
28          ePtr start();
29          ePtr getNextElement();
30          ePtr getElement(int i);
31          ePtr setElement(int i, ePtr e);
32          distribution(int size, long double* values, double* indices);
33          ~distribution();
34  };
```

FIG. 19B

```
1  ePtr distribution::start()
2  {
3    if (num == 0) return 0;
4    else if (num == 1)
5    {
6          nxt = 0;
7          return elements;
8    }
9    else
10   {
11         nxt = elements + 1;
12         return elements;
13   }
14 }
15
16 ePtr distribution::getNextElement()
17 {
18   ePtr ret = nxt;
19
20   if (nxt != 0)
21   {
22         if (nxt == elements + num - 1) nxt = 0;
23         else nxt++;
24         return ret;
25   }
26   else return 0;
27 }
28
29 ePtr distribution::getElement(int i)
30 {
31   if (i > (num - 1)) return 0;
32   else return elements + i;
33 }
```

FIG. 19C

```
34 ePtr distribution::setElement(int i, ePtr e)
35 {
36  ePtr el;
37
38  el = getElement(i);
39  if (el == 0) return 0;
40  else
41  {
42       *el = *e;
43       return el;
44  };
45 }
46
47 distribution::distribution(int size, long double* values, double* indices)
48 {
49  int i;
50  ePtr e;
51
52  elements = new D_Element[size];
53  e = elements;
54
55  for (i = 0; i < size; i++)
56  {
57       e->index = *indices++;
58       e->value = *values++;
59       e++;
60  };
61  num = size;
62  nxt = 0;
63
64 }
65
66 distribution::~distribution()
67 {
68  delete [] elements;
69 }
```

FIG. 19D

```
 70 long double Jensen_Shannon (distribution* P, distribution* Q)
 71 {
 72     ePtr p;
 73     ePtr q;
 74
 75     long double logPQ;
 76
 77     long double sumPlogPplusQ = 0,
 78                 sumQlogPplusQ = 0,
 79                 sumPlogP = 0,
 80                 sumQlogQ = 0;
 81
 82     p = P->start();
 83     q = Q->start();
 84     if (p == 0 && q == 0) return 0;
 85     while (true)
 86     {
 87         if (p != 0)
 88         {
 89             if (q != 0)
 90             {
 91                 if (p->index == q->index)
 92                 {
 93                     if (p->value != 0 && q->value != 0)
 94                     {
 95                         logPQ = log(p->value + q->value);
 96                         sumPlogPplusQ += p->value * logPQ;
 97                         sumQlogPplusQ += q->value * logPQ;
 98                         sumPlogP += p->value * log(p->value);
 99                         sumQlogQ += q->value * log(q->value);
100                         p = P->getNextElement();
101                         q = Q->getNextElement();
102                         if (p == 0 && q == 0) break;
103                     }
104                 }
105                 else if (p->index < q->index) p = P->getNextElement();
106                 else q = Q->getNextElement();
107             }
108             else
109             {
110                 p = P->getNextElement();
111                 if (p == 0) break;
112             }
113         }
114         else
115         {
116             q = Q->getNextElement();
117             if (q == 0) break;
118         }
119     }
120
121     return (2 + oneoverln2 * (sumPlogP + sumQlogQ - sumPlogPplusQ - sumQlogPplusQ)) /
122  2;
123 }
```

FIG. 19E

PROBABILITY-DISTRIBUTION-BASED LOG-FILE ANALYSIS

TECHNICAL FIELD

The current document is directed to event logging and log files and, in particular, to systems, and methods incorporated within the systems, that carry out probability-distribution-based analysis of log-file entries.

BACKGROUND

During the past seven decades, electronic computing has evolved from primitive, vacuum-tube-based computer systems, initially developed during the 1940s, to modern electronic computing systems in which large numbers of multi-processor servers, work stations, and other individual computing systems are networked together with large-capacity data-storage devices and other electronic devices to produce geographically distributed computing systems with hundreds of thousands, millions, or more components that provide enormous computational bandwidths and data-storage capacities. These large, distributed computing systems are made possible by advances in computer networking, distributed operating systems and applications, data-storage appliances, computer hardware, and software technologies. Despite all of these advances, however, the rapid increase in the size and complexity of computing systems has been accompanied by numerous scaling issues and technical challenges, including technical challenges associated with communications overheads encountered in parallelizing computational tasks among multiple processors, component failures, and distributed-system management. As new distributed-computing technologies are developed and as general hardware and software technologies continue to advance, the current trend towards ever-larger and more complex distributed computing systems appears likely to continue well into the future.

In modern computing systems, individual computers, subsystems, and components generally output large volumes of status, informational, and error messages that are collectively referred to, in the current document, as "event messages." In large, distributed computing systems, terabytes of event messages may be generated each day. The event messages are often collected into event logs stored as files in data-storage appliances and are often analyzed both in real time, as they are generated and received, as well as retrospectively, after the event messages have been initially processed and stored in event logs. Event messages may contain information that can be used to detect serious failures and operational deficiencies prior to the accumulation of a sufficient number of failures and system-degrading events that lead to data loss and significant down time. The information contained in event messages may also be used to detect and ameliorate various types of security breaches and issues, to intelligently manage and maintain distributed computing systems, and to diagnose many different classes of operational problems, hardware-design deficiencies, and software-design deficiencies. It has proved to be a challenging task for system administrators, system designers and developers, and system users to identify information within the enormous event logs generated in distributed computing systems relevant to detecting and diagnosing operational anomalies and useful in administering, managing, and maintaining distributed computer systems.

SUMMARY

The current document is directed to systems, and methods incorporated within the systems, that carry out probability-distribution-based analysis of log-file entries. A monitoring subsystem within a distributed computer system uses probability-distribution-based analysis of log-file entries to detect changes in the state of the distributed computer system. A log-file-analysis subsystem within a distributed computer system uses probability-distribution-based analysis of log-file entries to identify subsets of log-file entries that predict anomalies and impending problems in the distributed computer system. In many implementations, a numerical comparison of probability distributions of log-file-entry types is used to detect state changes in the distributed computer system.

BRIEF DESCRIPTION OF THE DRAWINGS

In FIG. 9, three different physical data centers 902-904 are shown below planes representing the cloud-director layer of abstraction 906-908.

FIG. 12 shows a small, 11-entry portion of a log file from a distributed computer system.

FIG. 19A illustrates calculation of the Kullbach-Leibler divergence for the pairs of probability distributions shown in FIGS. 18A-B.

FIGS. 19B-E show a C++ encoding of a method to compute the Jensen-Shannon divergence for two probability distributions, such as probability distributions corresponding to the probabilities of selecting log-file entries of particular types or with particular error_code values from particular time intervals within a log file or virtual log file.

DETAILED DESCRIPTION

Figure 1:
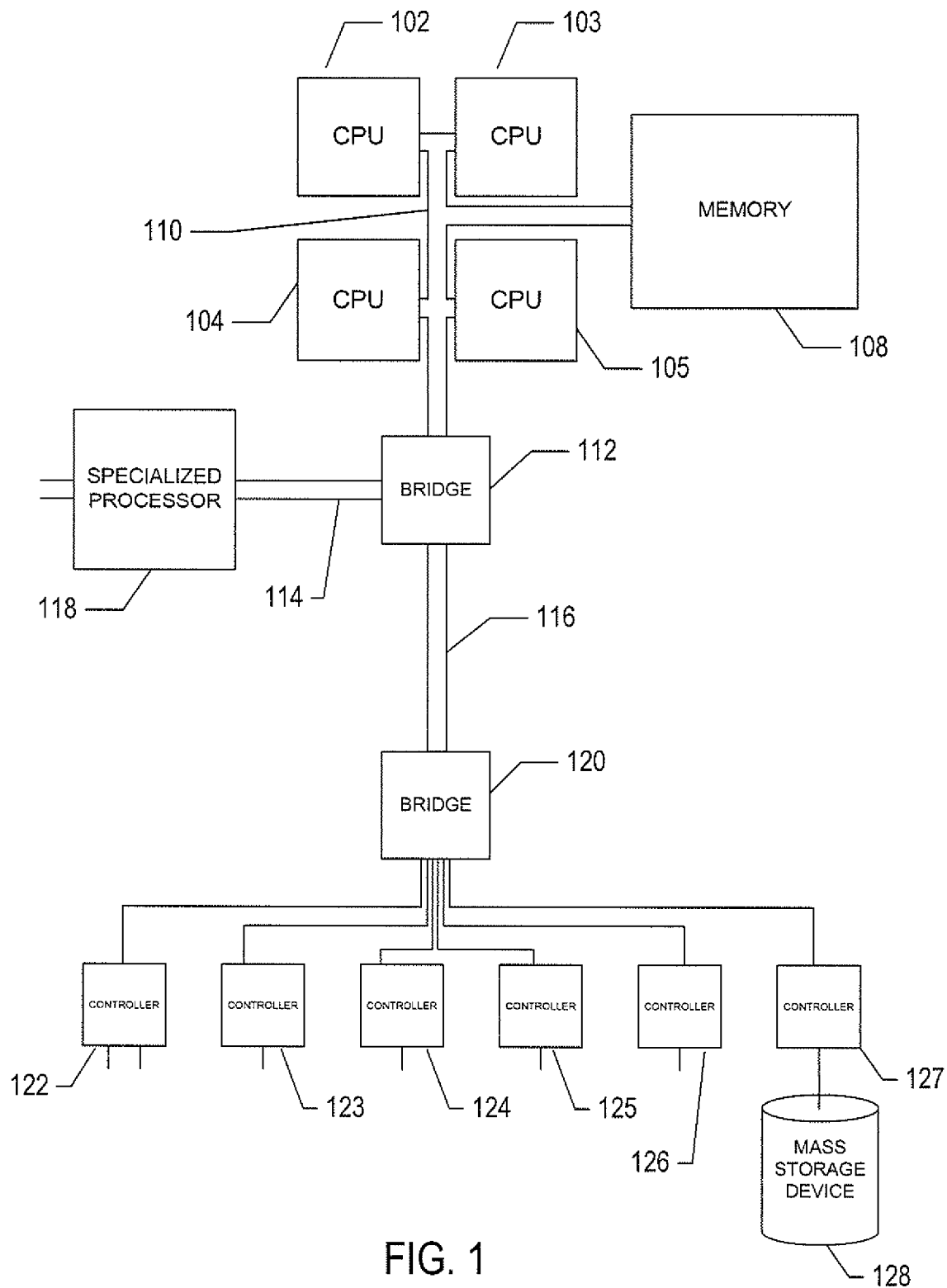
FIG. 1 provides a general architectural diagram for various types of computers.

The current document is directed to systems, and methods incorporated within the systems, that carry out probability-distribution-based analysis of log-file entries. In a first subsection, below, a detailed description of computer hardware, complex computational systems, and virtualization is provided with reference to FIGS. 1-10. In a second subsection, probability-distribution-based analysis of log-file entries is discussed with reference to FIGS. 11-22.

Computer Hardware, Complex Computational Systems, and Virtualization

The term "abstraction" is not, in any way, intended to mean or suggest an abstract idea or concept. Computational abstractions are tangible, physical interfaces that are implemented, ultimately, using physical computer hardware, data-storage devices, and communications systems. Instead, the term "abstraction" refers, in the current discussion, to a logical level of functionality encapsulated within one or more concrete, tangible, physically-implemented computer systems with defined interfaces through which electronically-encoded data is exchanged, process execution launched, and electronic services are provided. Interfaces may include graphical and textual data displayed on physical display devices as well as computer programs and routines that control physical computer processors to carry out various tasks and operations and that are invoked through electronically implemented application programming interfaces ("APIs") and other electronically implemented interfaces. There is a tendency among those unfamiliar with modern technology and science to misinterpret the terms "abstract" and "abstraction," when used to describe certain aspects of modern computing. For example, one frequently encounters assertions that, because a computational system is described in terms of abstractions, functional layers, and interfaces, the computational system is somehow different from a physical machine or device. Such allegations are unfounded. One only needs to disconnect a computer system or group of computer systems from their respective power supplies to appreciate the physical, machine nature of complex computer technologies. One also frequently encounters statements that characterize a computational technology as being "only software," and thus not a machine or device. Software is essentially a sequence of encoded symbols, such as a printout of a computer program or digitally encoded computer instructions sequentially stored in a file on an optical disk or within an electromechanical mass-storage device. Software alone can do nothing. It is only when encoded computer instructions are loaded into an electronic memory within a computer system and executed on a physical processor that so-called "software implemented" functionality is provided. The digitally encoded computer instructions are an essential and physical control component of processor-controlled machines and devices, no less essential and physical than a cam-shaft control system in an internal-combustion engine. Multi-cloud aggregations, cloud-computing services, virtual-machine containers and virtual machines, communications interfaces, and many of the other topics discussed below are tangible, physical components of physical, electro-optical-mechanical computer systems.

FIG. 1 provides a general architectural diagram for various types of computers. Computers that receive, process, and store event messages may be described by the general architectural diagram shown in FIG. 1, for example. The computer system contains one or multiple central processing units ("CPUs") 102-105, one or more electronic memories 108 interconnected with the CPUs by a CPU/memory-subsystem bus 110 or multiple busses, a first bridge 112 that interconnects the CPU/memory-subsystem bus 110 with additional busses 114 and 116, or other types of high-speed interconnection media, including multiple, high-speed serial interconnects. These busses or serial interconnections, in turn, connect the CPUs and memory with specialized processors, such as a graphics processor 118, and with one or more additional bridges 120, which are interconnected with high-speed serial links or with multiple controllers 122-127, such as controller 127, that provide access to various different types of mass-storage devices 128, electronic displays, input devices, and other such components, subcomponents, and computational resources. It should be noted that computer-readable data-storage devices include optical and electromagnetic disks, electronic memories, and other physical data-storage devices. Those familiar with modern science and technology appreciate that electromagnetic radiation and propagating signals do not store data for subsequent retrieval, and can transiently "store" only a byte or less of information per mile, far less information than needed to encode even the simplest of routines.

Of course, there are many different types of computer-system architectures that differ from one another in the number of different memories, including different types of hierarchical cache memories, the number of processors and the connectivity of the processors with other system components, the number of internal communications busses and serial links, and in many other ways. However, computer systems generally execute stored programs by fetching instructions from memory and executing the instructions in one or more processors. Computer systems include general-purpose computer systems, such as personal computers ("PCs"), various types of servers and workstations, and higher-end mainframe computers, but may also include a plethora of various types of special-purpose computing devices, including data-storage systems, communications routers, network nodes, tablet computers, and mobile telephones.

Figure 2:
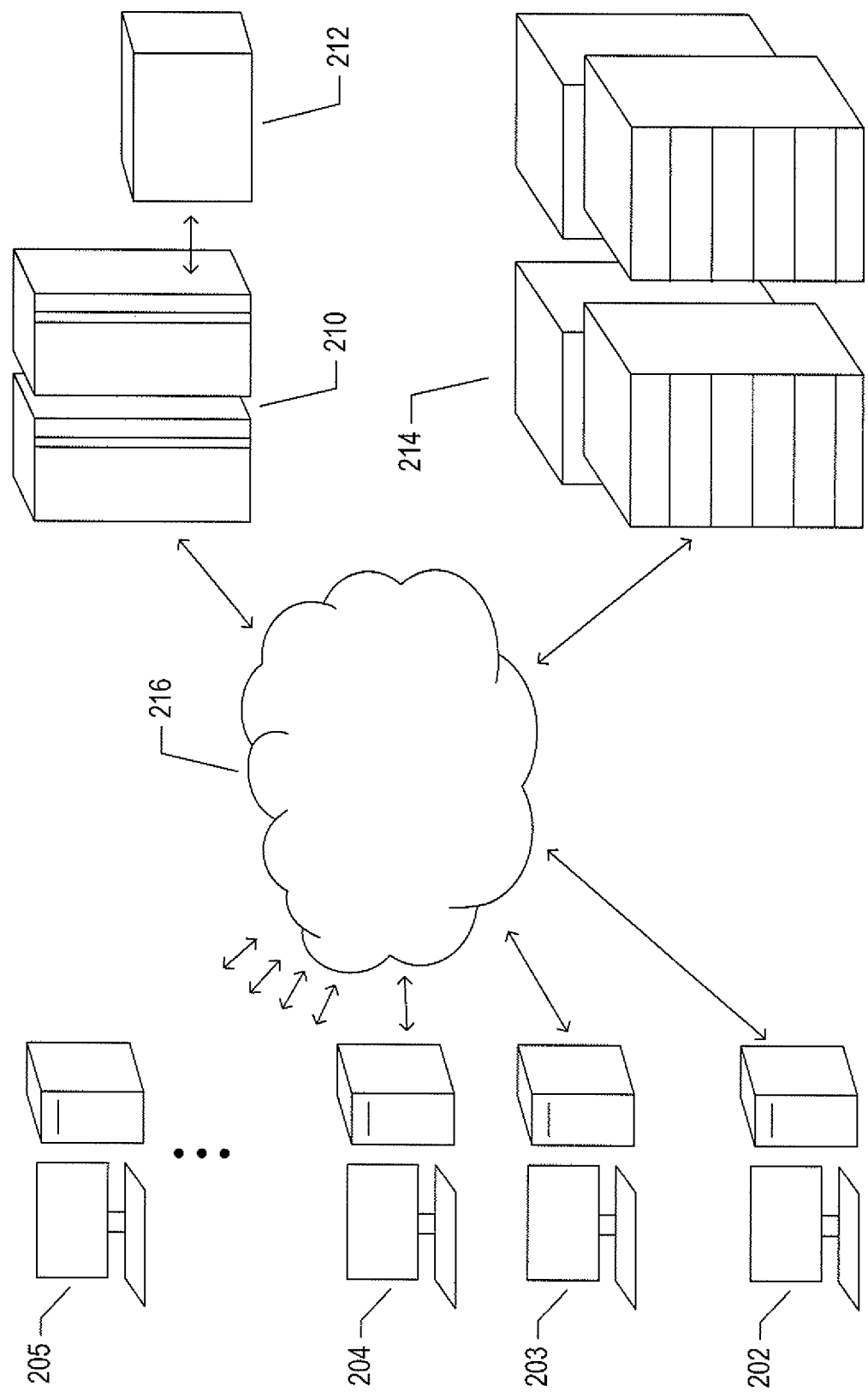
FIG. 2 illustrates an Internet-connected distributed computer system.

FIG. 2 illustrates an Internet-connected distributed computer system. As communications and networking technologies have evolved in capability and accessibility, and as the computational bandwidths, data-storage capacities, and other capabilities and capacities of various types of computer systems have steadily and rapidly increased, much of modern computing now generally involves large distributed systems and computers interconnected by local networks, wide-area networks, wireless communications, and the Internet. FIG. 2 shows a typical distributed system in which a large number of PCs 202-205, a high-end distributed mainframe system 210 with a large data-storage system 212, and a large computer center 214 with large numbers of rack-mounted servers or blade servers all interconnected through various communications and networking systems that together comprise the Internet 216. Such distributed computing systems provide diverse arrays of functionalities. For example, a PC user sitting in a home office may access hundreds of millions of different web sites provided by hundreds of thousands of different web servers throughout the world and may access high-computational-bandwidth computing services from remote computer facilities for running complex computational tasks.

Until recently, computational services were generally provided by computer systems and data centers purchased, configured, managed, and maintained by service-provider organizations. For example, an e-commerce retailer generally purchased, configured, managed, and maintained a data center including numerous web servers, back-end computer systems, and data-storage systems for serving web pages to remote customers, receiving orders through the web-page interface, processing the orders, tracking completed orders, and other myriad different tasks associated with an e-commerce enterprise.

Figure 3:
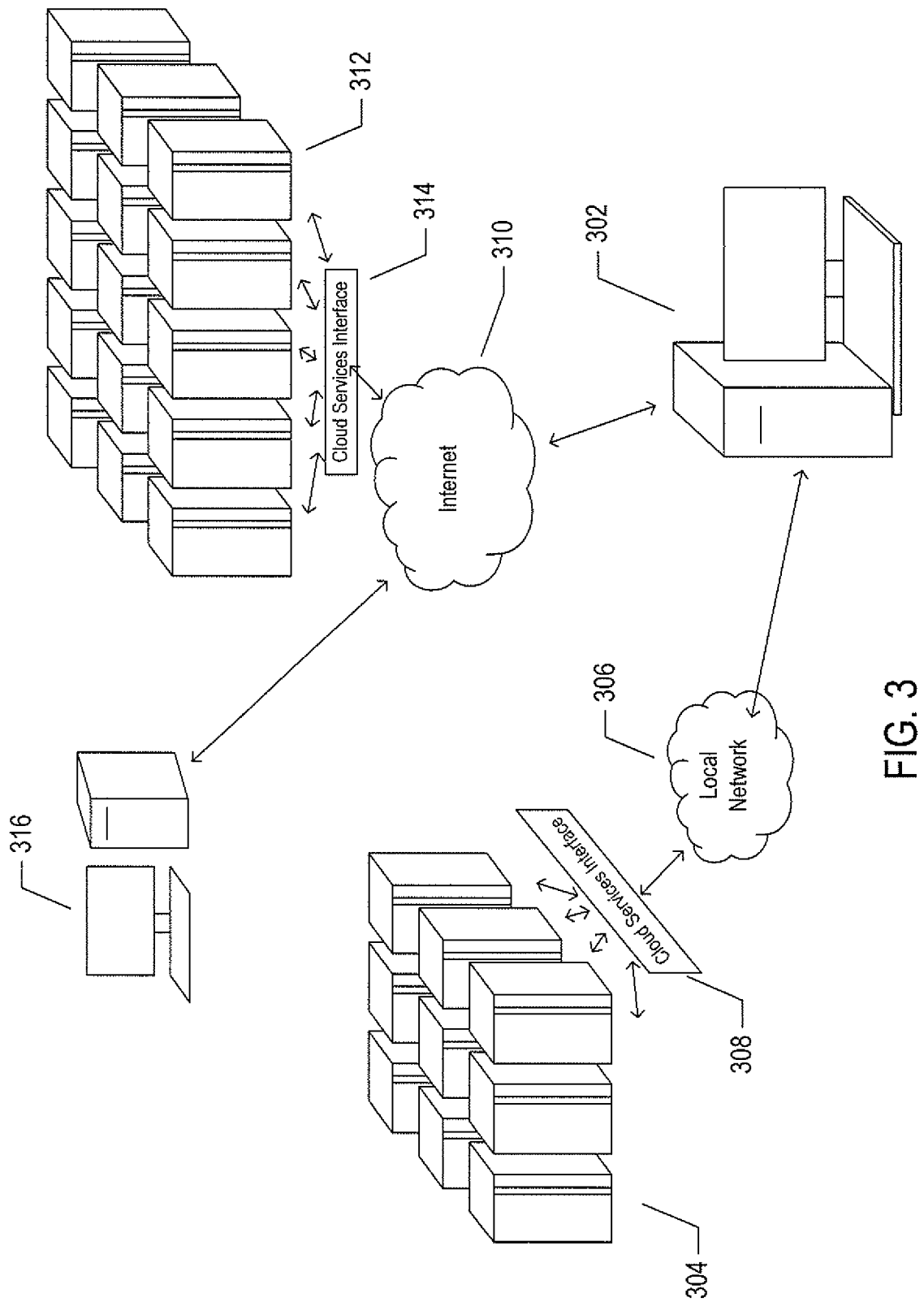
FIG. 3 illustrates cloud computing. In the recently developed cloud-computing paradigm, computing cycles and data-storage facilities are provided to organizations and individuals by cloud-computing providers.

FIG. 3 illustrates cloud computing. In the recently developed cloud-computing paradigm, computing cycles and data-storage facilities are provided to organizations and individuals by cloud-computing providers. In addition, larger organizations may elect to establish private cloud-computing facilities in addition to, or instead of, subscribing to computing services provided by public cloud-computing service providers. In FIG. 3, a system administrator for an organization, using a PC 302, accesses the organization's private cloud 304 through a local network 306 and private-cloud interface 308 and also accesses, through the Internet 310, a public cloud 312 through a public-cloud services interface 314. The administrator can, in either the case of the private cloud 304 or public cloud 312, configure virtual computer systems and even entire virtual data centers and launch execution of application programs on the virtual computer systems and virtual data centers in order to carry out any of many different types of computational tasks. As one example, a small organization may configure and run a virtual data center within a public cloud that executes web servers to provide an e-commerce interface through the public cloud to remote customers of the organization, such as a user viewing the organization's c-commerce web pages on a remote user system 316.

Cloud-computing facilities are intended to provide computational bandwidth and data-storage services much as utility companies provide electrical power and water to consumers. Cloud computing provides enormous advantages to small organizations without the resources to purchase, manage, and maintain in-house data centers. Such organizations can dynamically add and delete virtual computer systems from their virtual data centers within public clouds in order to track computational-bandwidth and data-storage needs, rather than purchasing sufficient computer systems within a physical data center to handle peak computational-bandwidth and data-storage demands. Moreover, small organizations can completely avoid the overhead of maintaining and managing physical computer systems, including hiring and periodically retraining information-technology specialists and continuously paying for operating-system and database-management-system upgrades. Furthermore, cloud-computing interfaces allow for easy and straightforward configuration of virtual computing facilities, flexibility in the types of applications and operating systems that can be configured, and other functionalities that are useful even for owners and administrators of private cloud-computing facilities used by a single organization.

Figure 4:
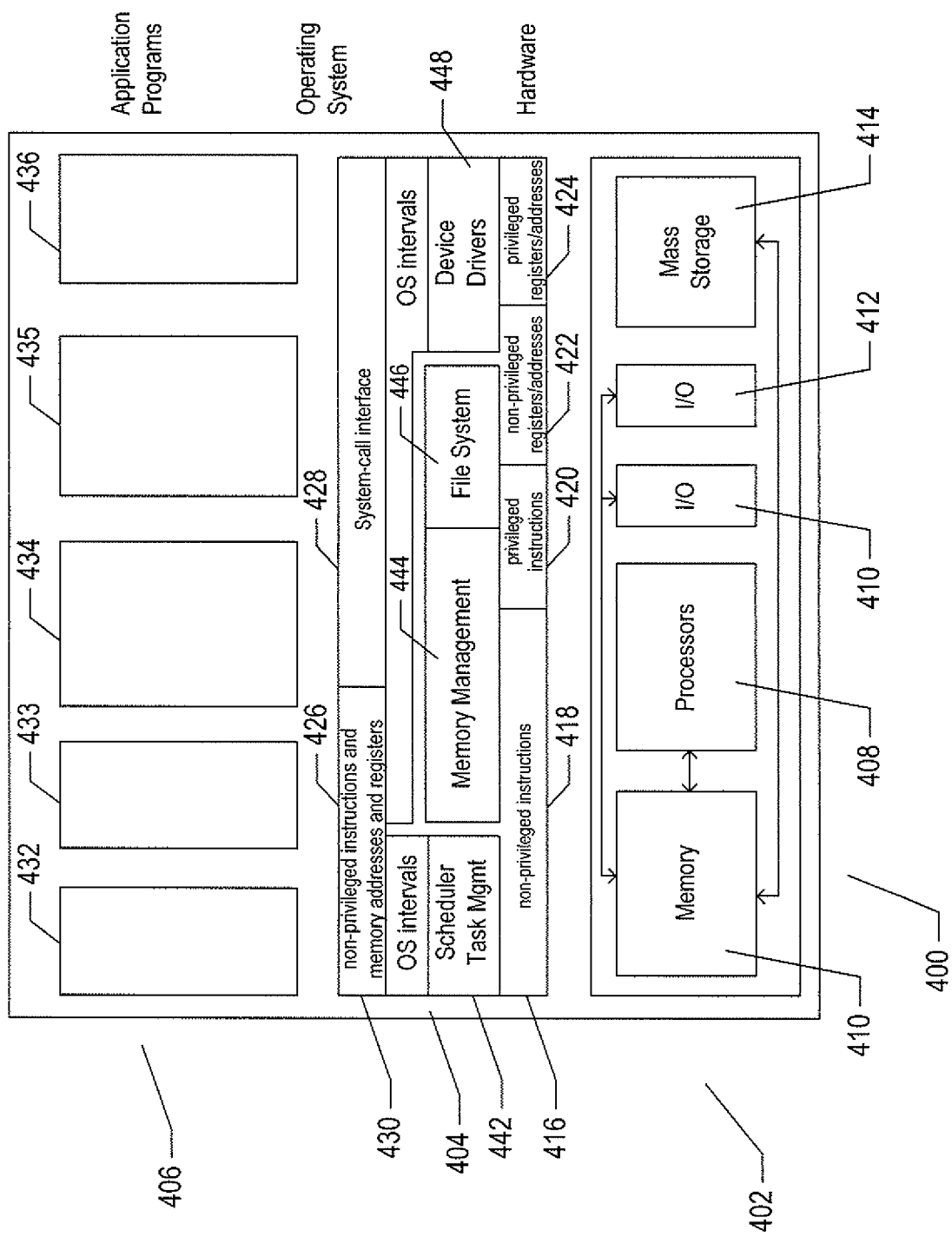
FIG. 4 illustrates generalized hardware and software components of a general-purpose computer system, such as a general-purpose computer system having an architecture similar to that shown in FIG. 1.

FIG. 4 illustrates generalized hardware and software components of a general-purpose computer system, such as a general-purpose computer system having an architecture similar to that shown in FIG. 1. The computer system 400 is often considered to include three fundamental layers: (1) a hardware layer or level 402; (2) an operating-system layer or level 404; and (3) an application-program layer or level 406. The hardware layer 402 includes one or more processors 408, system memory 410, various different types of input-output ("I/O") devices 410 and 412, and mass-storage devices 414. Of course, the hardware level also includes many other components, including power supplies, internal communications links and busses, specialized integrated circuits, many different types of processor-controlled or microprocessor-controlled peripheral devices and controllers, and many other components. The operating system 404 interfaces to the hardware level 402 through a low-level operating system and hardware interface 416 generally comprising a set of non-privileged computer instructions 418, a set of privileged computer instructions 420, a set of non-privileged registers and memory addresses 422, and a set of privileged registers and memory addresses 424. In general, the operating system exposes non-privileged instructions, non-privileged registers, and non-privileged memory addresses 426 and a system-call interface 428 as an operating-system interface 430 to application programs 432-436 that execute within an execution environment provided to the application programs by the operating system. The operating system, alone, accesses the privileged instructions, privileged registers, and privileged memory addresses. By reserving access to privileged instructions, privileged registers, and privileged memory addresses, the operating system can ensure that application programs and other higher-level computational entities cannot interfere with one another's execution and cannot change the overall state of the computer system in ways that could deleteriously impact system operation. The operating system includes many internal components and modules, including a scheduler 442, memory management 444, a file system 446, device drivers 448, and many other components and modules. To a certain degree, modern operating systems provide numerous levels of abstraction above the hardware level, including virtual memory, which provides to each application program and other computational entities a separate, large, linear memory-address space that is mapped by the operating system to various electronic memories and mass-storage devices. The scheduler orchestrates interleaved execution of various different application programs and higher-level computational entities, providing to each application program a virtual, stand-alone system devoted entirely to the application program. From the application program's standpoint, the application program executes continuously without concern for the need to share processor resources and other system resources with other application programs and higher-level computational entities. The device drivers abstract details of hardware-component operation, allowing application programs to employ the system-call interface for transmitting and receiving data to and from communications networks, mass-storage devices, and other I/O devices and subsystems. The file system 436 facilitates abstraction of mass-storage-device and memory resources as a high-level, easy-to-access, file-system interface. Thus, the development and evolution of the operating system has resulted in the generation of a type of multi-faceted virtual execution environment for application programs and other higher-level computational entities.

While the execution environments provided by operating systems have proved to be an enormously successful level of abstraction within computer systems, the operating-system-provided level of abstraction is nonetheless associated with difficulties and challenges for developers and users of application programs and other higher-level computational entities. One difficulty arises from the fact that there are many different operating systems that run within various different types of computer hardware. In many cases, popular application programs and computational systems are developed to run on only a subset of the available operating systems, and can therefore be executed within only a subset of the various different types of computer systems on which the operating systems are designed to run. Often, even when an application program or other computational system is ported to additional operating systems, the application program or other computational system can nonetheless run more efficiently on the operating systems for which the application program or other computational system was originally targeted. Another difficulty arises from the increasingly distributed nature of computer systems. Although distributed operating systems are the subject of considerable research and development efforts, many of the popular operating systems are designed primarily for execution on a single computer system. In many cases, it is difficult to move application programs, in real time, between the different computer systems of a distributed computer system for high-availability, fault-tolerance, and load-balancing purposes. The problems are even greater in heterogeneous distributed computer systems which include different types of hardware and devices running different types of operating systems. Operating systems continue to evolve, as a result of which certain older application programs and other computational entities may be incompatible with more recent versions of operating systems for which they are targeted, creating compatibility issues that are particularly difficult to manage in large distributed systems.

Figure 5A:
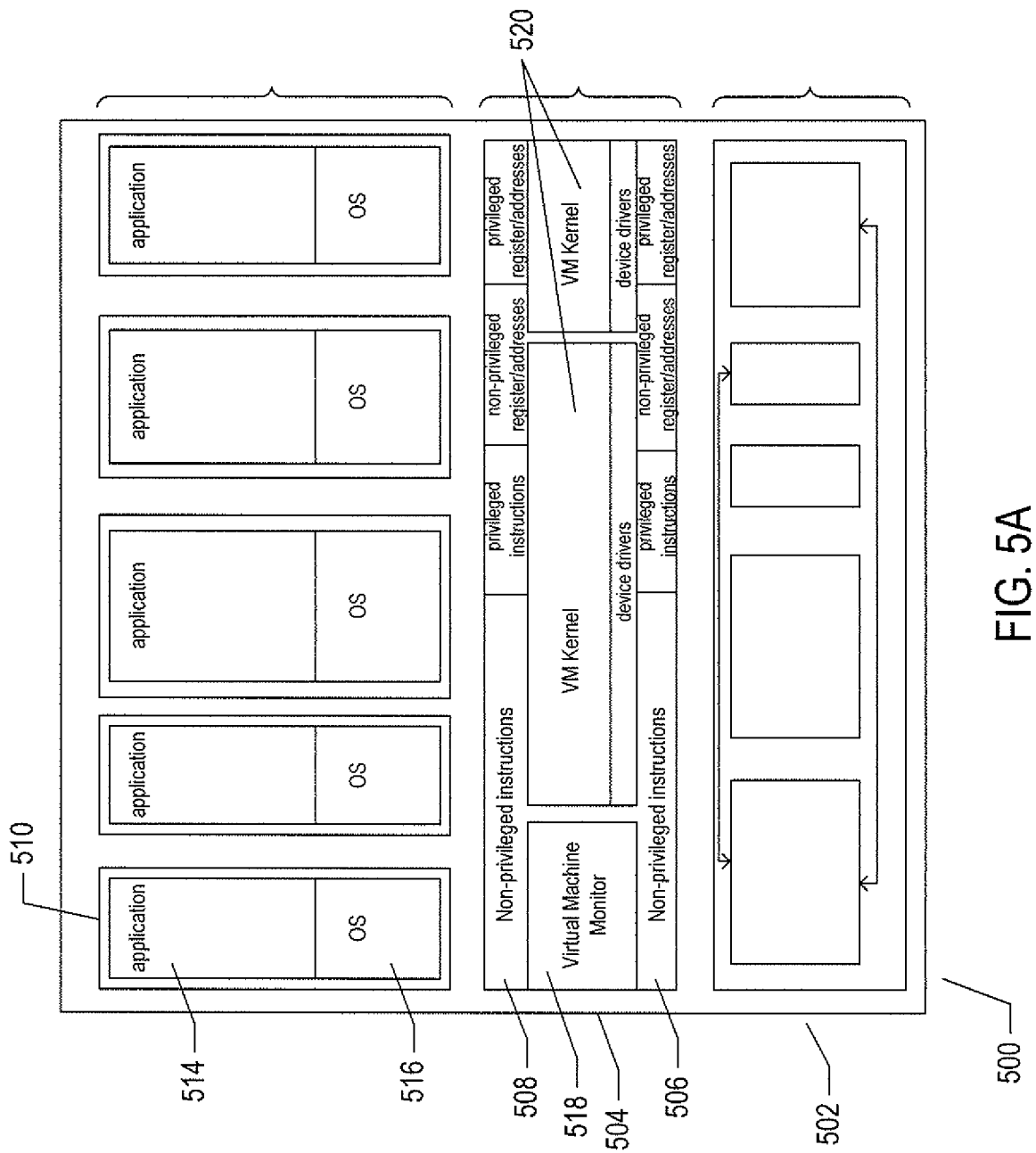
FIGS. 5A-B illustrate two types of virtual machine and virtual-machine execution environments.
Figure 5B:
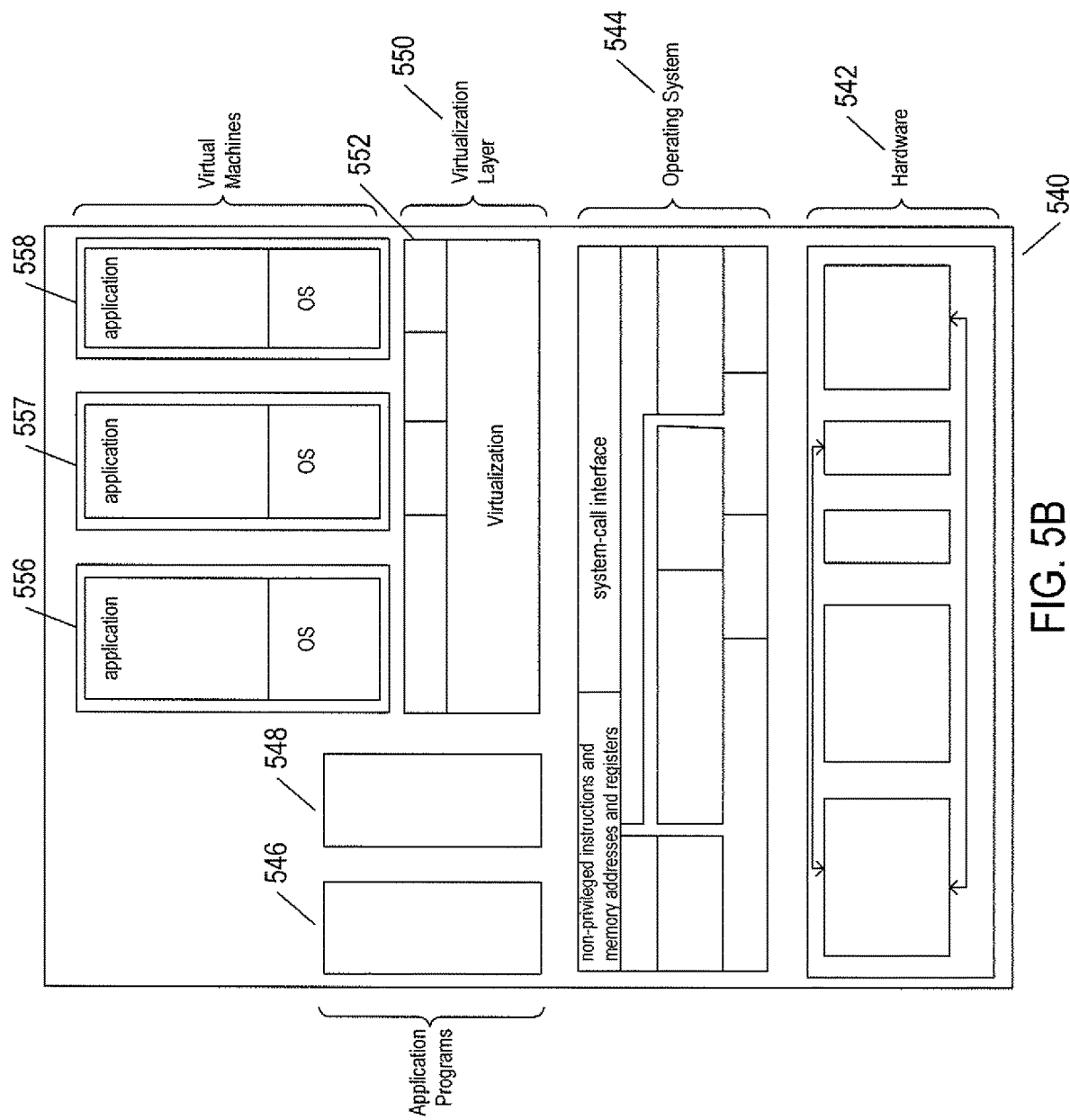

For all of these reasons, a higher level of abstraction, referred to as the "virtual machine," has been developed and evolved to further abstract computer hardware in order to address many difficulties and challenges associated with traditional computing systems, including the compatibility issues discussed above. FIGS. 5A-B illustrate two types of virtual machine and virtual-machine execution environments. FIGS. 5A-B use the same illustration conventions as used in FIG. 4. FIG. 5A shows a first type of virtualization. The computer system 500 in FIG. 5A includes the same hardware layer 502 as the hardware layer 402 shown in FIG. 4. However, rather than providing an operating system layer directly above the hardware layer, as in FIG. 4, the virtualized computing environment illustrated in FIG. 5A features a virtualization layer 504 that interfaces through a virtualization-layer/hardware-layer interface 506, equivalent to interface 416 in FIG. 4, to the hardware. The virtualization layer provides a hardware-like interface 508 to a number of virtual machines, such as virtual machine 510, executing above the virtualization layer in a virtual-machine layer 512. Each virtual machine includes one or more application programs or other higher-level computational entities packaged together with an operating system, referred to as a "guest operating system," such as application 514 and guest operating system 516 packaged together within virtual machine 510. Each virtual machine is thus equivalent to the operating-system layer 404 and application-program layer 406 in the general-purpose computer system shown in FIG. 4. Each guest operating system within a virtual machine interfaces to the virtualization-layer interface 508 rather than to the actual hardware interface 506. The virtualization layer partitions hardware resources into abstract virtual-hardware layers to which each guest operating system within a virtual machine interfaces. The guest operating systems within the virtual machines, in general, are unaware of the virtualization layer and operate as if they were directly accessing a true hardware interface. The virtualization layer ensures that each of the virtual machines currently executing within the virtual environment receive a fair allocation of underlying hardware resources and that all virtual machines receive sufficient resources to progress in execution. The virtualization-layer interface 508 may differ for different guest operating systems. For example, the virtualization layer is generally able to provide virtual hardware interfaces for a variety of different types of computer hardware. This allows, as one example, a virtual machine that includes a guest operating system designed for a particular computer architecture to ran on hardware of a different architecture. The number of virtual machines need not be equal to the number of physical processors or even a multiple of the number of processors.

The virtualization layer includes a virtual-machine-monitor module 518 ("VMM") that virtualizes physical processors in the hardware layer to create virtual processors on which each of the virtual machines executes. For execution efficiency, the virtualization layer attempts to allow virtual machines to directly execute non-privileged instructions and to directly access non-privileged registers and memory. However, when the guest operating system within a virtual machine accesses virtual privileged instructions, virtual privileged registers, and virtual privileged memory through the virtualization-layer interface 508, the accesses result in execution of virtualization-layer code to simulate or emulate the privileged resources. The virtualization layer additionally includes a kernel module 520 that manages memory, communications, and data-storage machine resources on behalf of executing virtual machines ("VM kernel"). The VM kernel, for example, maintains shadow page tables on each virtual machine so that hardware-level virtual-memory facilities can be used to process memory accesses. The VM kernel additionally includes routines that implement virtual communications and data-storage devices as well as device drivers that directly control the operation of underlying hardware communications and data-storage devices. Similarly, the VM kernel virtualizes various other types of I/O devices, including keyboards, optical-disk drives, and other such devices. The virtualization layer essentially schedules execution of virtual machines much like an operating system schedules execution of application programs, so that the virtual machines each execute within a complete and fully functional virtual hardware layer.

FIG. 5B illustrates a second type of virtualization. In FIG. 5B, the computer system 540 includes the same hardware layer 542 and software layer 544 as the hardware layer 402 shown in FIG. 4. Several application programs 546 and 548 are shown running in the execution environment provided by the operating system. In addition, a virtualization layer 550 is also provided, in computer 540, but, unlike the virtualization layer 504 discussed with reference to FIG. 5A, virtualization layer 550 is layered above the operating system 544, referred to as the "host OS," and uses the operating system interface to access operating-system-provided functionality as well as the hardware. The virtualization layer 550 comprises primarily a VMM and a hardware-like interface 552, similar to hardware-like interface 508 in FIG. 5A. The virtualization-layer/hardware-layer interface 552, equivalent to interface 416 in FIG. 4, provides an execution environment for a number of virtual machines 556-558, each including one or more application programs or other higher-level computational entities packaged together with a guest operating system.

In FIGS. 5A-B, the layers are somewhat simplified for clarity of illustration. For example, portions of the virtualization layer 550 may reside within the host-operating-system kernel, such as a specialized driver incorporated into the host operating system to facilitate hardware access by the virtualization layer.

It should be noted that virtual hardware layers, virtualization layers, and guest operating systems are all physical entities that are implemented by computer instructions stored in physical data-storage devices, including electronic memories, mass-storage devices, optical disks, magnetic disks, and other such devices. The term "virtual" does not, in any way, imply that virtual hardware layers, virtualization layers, and guest operating systems are abstract or intangible. Virtual hardware layers, virtualization layers, and guest operating systems execute on physical processors of physical computer systems and control operation of the physical computer systems, including operations that alter the physical states of physical devices, including electronic memories and mass-storage devices. They are as physical and tangible as any other component of a computer since, such as power supplies, controllers, processors, busses, and data-storage devices.

Figure 6:
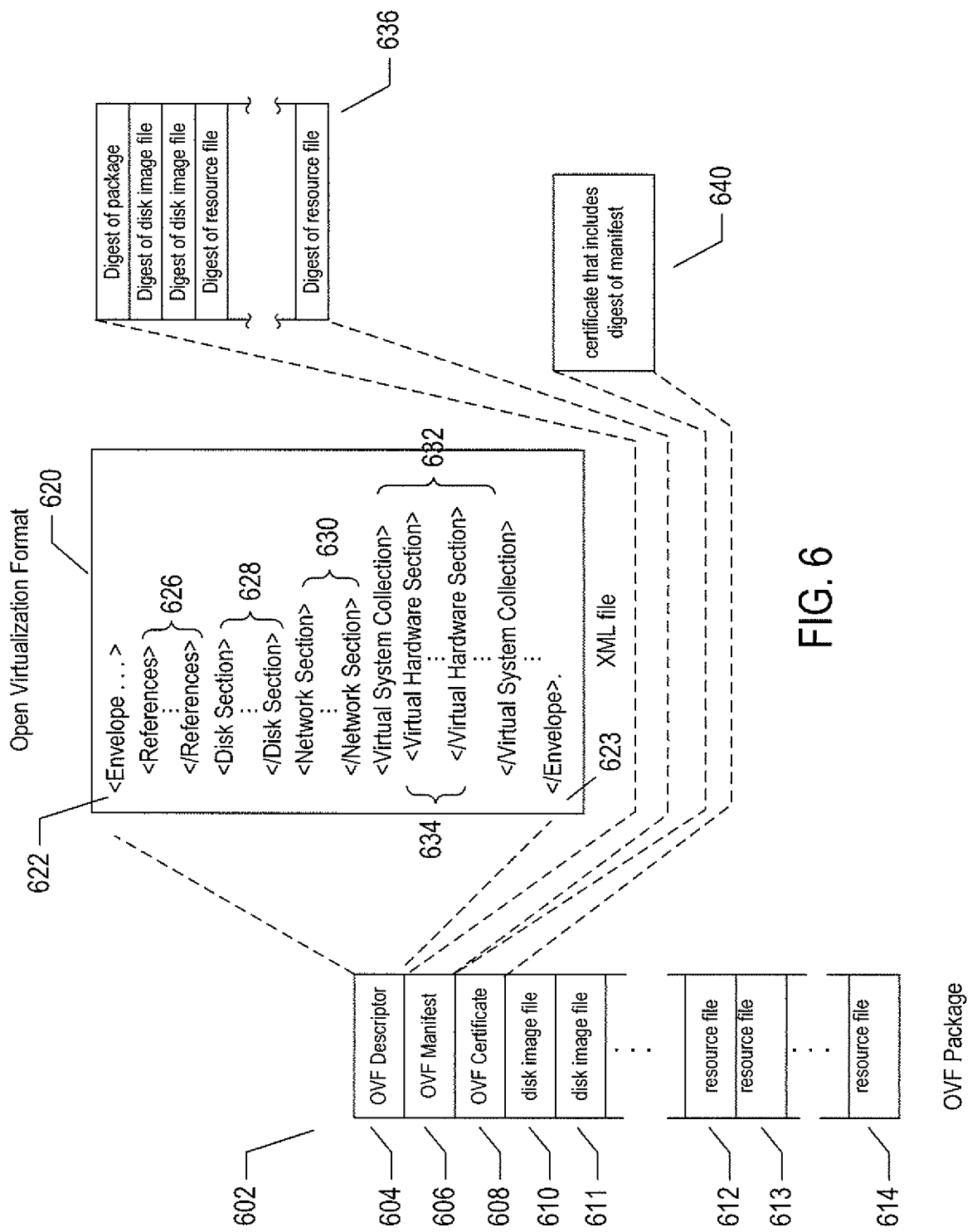
FIG. 6 illustrates an OVF package.

A virtual machine or virtual application, described below, is encapsulated within a data package for transmission, distribution, and loading into a virtual-execution environment. One public standard for virtual-machine encapsulation is referred to as the "open virtualization format" ("OVF"). The OVF standard specifies a format for digitally encoding a virtual machine within one or more data files. FIG. 6 illustrates an OVF package. An OVF package 602 includes an OVF descriptor 604, an OVF manifest 606, an OVF certificate 608, one or more disk-image files 610-611, and one or more resource files 612-614. The OVF package can be encoded and stored as a single file or as a set of files. The OVF descriptor 604 is an XML document 620 that includes a hierarchical set of elements, each demarcated by a beginning tag and an ending tag. The outermost, or highest-level, element is the envelope element, demarcated by tags 622 and 623. The next-level element includes a reference element 626 that includes references to all files that are part of the OVF package, a disk section 628 that contains meta information about all of the virtual disks included in the OVF package, a networks section 630 that includes meta information about all of the logical networks included in the OVF package, and a collection of virtual-machine configurations 632 which further includes hardware descriptions of each virtual machine 634. There are many additional hierarchical levels and elements within a typical OVF descriptor. The OVF descriptor is thus a self-describing, XML file that describes the contents of an OVF package. The OVF manifest 606 is a list of cryptographic-hash-function-generated digests 636 of the entire OVF package and of the various components of the OVF package. The OVF certificate 608 is an authentication certificate 640 that includes a digest of the manifest and that is cryptographically signed. Disk image files, such as disk image file 610, are digital encodings of the contents of virtual disks and resource files 612 are digitally encoded content, such as operating-system images. A virtual machine or a collection of virtual machines encapsulated together within a virtual application can thus be digitally encoded as one or more files within an OVF package that can be transmitted, distributed, and loaded using well-known tools for transmitting, distributing, and loading files. A virtual appliance is a software service that is delivered as a complete software stack installed within one or more virtual machines that is encoded within an OVF package.

Figure 7:
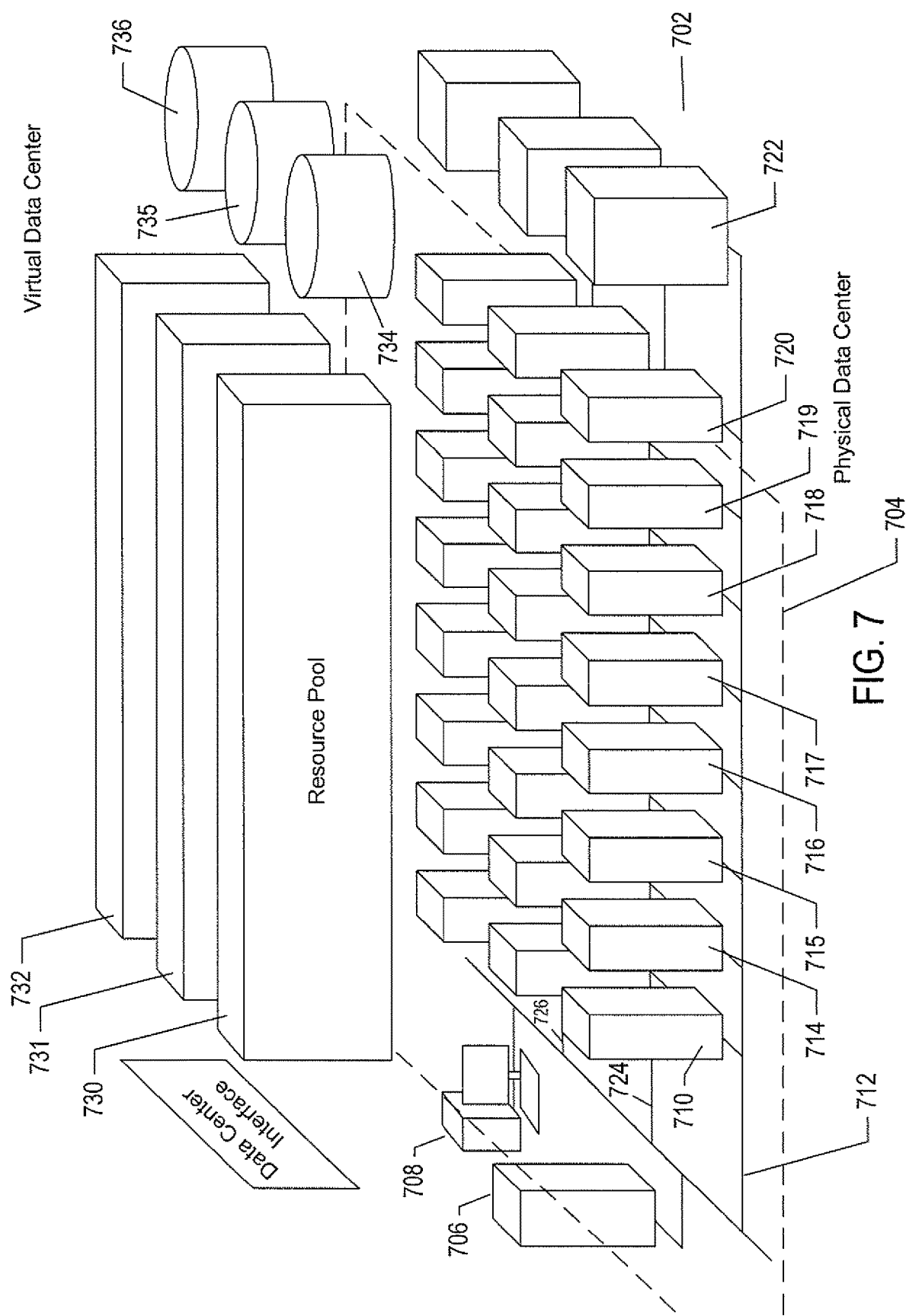
FIG. 7 illustrates virtual data centers provided as an abstraction of underlying physical-data-center hardware components.

The advent of virtual machines and virtual environments has alleviated many of the difficulties and challenges associated with traditional general-purpose computing. Machine and operating-system dependencies can be significantly reduced or entirely eliminated by packaging applications and operating systems together as virtual machines and virtual appliances that execute within virtual environments provided by virtualization layers running on many different types of computer hardware. A next level of abstraction, referred to as virtual data centers or virtual infrastructure, provide a data-center interface to virtual data centers computationally constructed within physical data centers. FIG. 7 illustrates virtual data centers provided as an abstraction of underlying physical-data-center hardware components. In FIG. 7, a physical data center 702 is shown below a virtual-interface plane 704. The physical data center consists of a virtual-data-center management server 706 and any of various different computers, such as PCs 708, on which a virtual-data-center management interface may be displayed to system administrators and other users. The physical data center additionally includes generally large numbers of server computers, such as server computer 710, that are coupled together by local area networks, such as local area network 712 that directly interconnects server computer 710 and 714-720 and a mass-storage array 722. The physical data center shown in FIG. 7 includes three local area networks 712, 724, and 726 that each directly interconnects a bank of eight servers and a mass-storage array. The individual server computers, such as server computer 710, each includes a virtualization layer and runs multiple virtual machines. Different physical data centers may include many different types of computers, networks, data-storage systems and devices connected according to many different types of connection topologies. The virtual-data-center abstraction layer 704, a logical abstraction layer shown by a plane in FIG. 7, abstracts the physical data center to a virtual data center comprising one or more resource pools, such as resource pools 730-732, one or more virtual data stores, such as virtual data stores 734-736, and one or more virtual networks. In certain implementations, the resource pools abstract banks of physical servers directly interconnected by a local area network.

Figure 8:
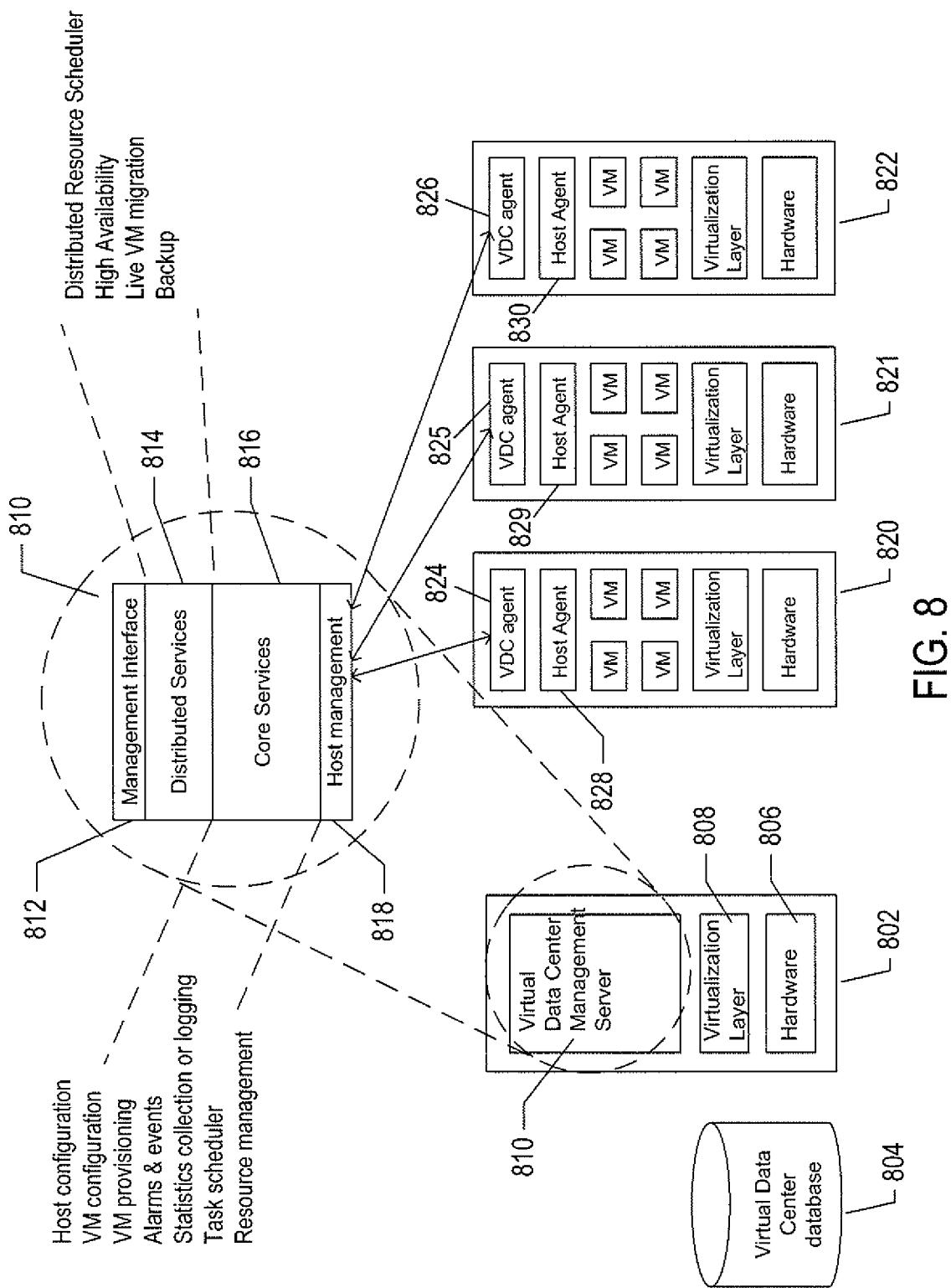
FIG. 8 illustrates virtual-machine components of a virtual-data-center management server and physical servers of a physical data center above which a virtual-data-center interface is provided by the virtual-data-center management server.

The virtual-data-center management interface allows provisioning and launching of virtual machines with respect to resource pools, virtual data stores, and virtual networks, so that virtual-data-center administrators need not be concerned with the identities of physical-data-center components used to execute particular virtual machines. Furthermore, the virtual-data-center management server includes functionality to migrate running virtual machines from one physical server to another in order to optimally or near optimally manage resource allocation, provide fault tolerance, and high availability by migrating virtual machines to most effectively utilize underlying physical hardware resources, to replace virtual machines disabled by physical hardware problems and failures, and to ensure that multiple virtual machines supporting a high-availability virtual appliance are executing on multiple physical computer systems so that the services provided by the virtual appliance are continuously accessible, even when one of the multiple virtual appliances becomes compute bound, data-access bound, suspends execution, or fails. Thus, the virtual data center layer of abstraction provides a virtual-data-center abstraction of physical data centers to simplify provisioning, launching, and maintenance of virtual machines and virtual appliances as well as to provide high-level, distributed functionalities that involve pooling the resources of individual physical servers and migrating virtual machines among physical servers to achieve load balancing, fault tolerance, and high availability. FIG. 8 illustrates virtual-machine components of a virtual-data-center management server and physical servers of a physical data center above which a virtual-data-center interface is provided by the virtual-data-center management server. The virtual-data-center management server 802 and a virtual-data-center database 804 comprise the physical components of the management component of the virtual data center. The virtual-data-center management server 802 includes a hardware layer 806 and virtualization layer 808, and runs a virtual-data-center management-server virtual machine 810 above the virtualization layer. Although shown as a single server in FIG. 8, the virtual-data-center management server ("VDC management server") may include two or more physical server computers that support multiple VDC-management-server virtual appliances. The virtual machine 810 includes a management-interface component 812, distributed services 814, core services 816, and a host-management interface 818. The management interface is accessed from any of various computers, such as the PC 708 shown in FIG. 7. The management interface allows the virtual-data-center administrator to configure a virtual data center, provision virtual machines, collect statistics and view log files for the virtual data center, and to carry out other, similar management tasks. The host-management interface 818 interfaces to virtual-data-center agents 824, 825, and 826 that execute as virtual machines within each of the physical servers of the physical data center that is abstracted to a virtual data center by the VDC management server.

The distributed services 814 include a distributed-resource scheduler that assigns virtual machines to execute within particular physical servers and that migrates virtual machines in order to most effectively make use of computational bandwidths, data-storage capacities, and network capacities of the physical data center. The distributed services further include a high-availability service that replicates and migrates virtual machines in order to ensure that virtual machines continue to execute despite problems and failures experienced by physical hardware components. The distributed services also include a live-virtual-machine migration service that temporarily halts execution of a virtual machine, encapsulates the virtual machine in an OVF package, transmits the OVF package to a different physical server, and restarts the virtual machine on the different physical server from a virtual-machine state recorded when execution of the virtual machine was halted. The distributed services also include a distributed backup service that provides centralized virtual-machine backup and restore.

The core services provided by the VDC management server include host configuration, virtual-machine configuration, virtual-machine provisioning, generation of virtual-data-center alarms and events, ongoing event logging and statistics collection, a task scheduler, and a resource-management module. Each physical server 820-822 also includes a host-agent virtual machine 828-830 through which the virtualization layer can be accessed via a virtual-infrastructure application programming interface ("API"). This interface allows a remote administrator or user to manage an individual server through the infrastructure API. The virtual-data-center agents 824-826 access virtualization-layer server information through the host agents. The virtual-data-center agents are primarily responsible for off-loading certain of the virtual-data-center management-server functions specific to a particular physical server to that physical server. The virtual-data-center agents relay and enforce resource allocations made by the VDC management server, relay virtual-machine provisioning and configuration-change commands to host agents, monitor and collect performance statistics, alarms, and events communicated to the virtual-data-center agents by the local host agents through the interface API, and to carry out other, similar virtual-data-management tasks.

The virtual-data-center abstraction provides a convenient and efficient level of abstraction for exposing the computational resources of a cloud-computing facility to cloud-computing-infrastructure users. A cloud-director management server exposes virtual resources of a cloud-computing facility to cloud-computing-infrastructure users. In addition, the cloud director introduces a multi-tenancy layer of abstraction, which partitions VDCs into tenant-associated VDCs that can each be allocated to a particular individual tenant or tenant organization, both referred to as a "tenant" A given tenant can be provided one or more tenant-associated VDCs by a cloud director managing the multi-tenancy layer of abstraction within a cloud-computing facility. The cloud services interface (308 in FIG. 3) exposes a virtual-data-center management interface that abstracts the physical data center.

Figure 9:
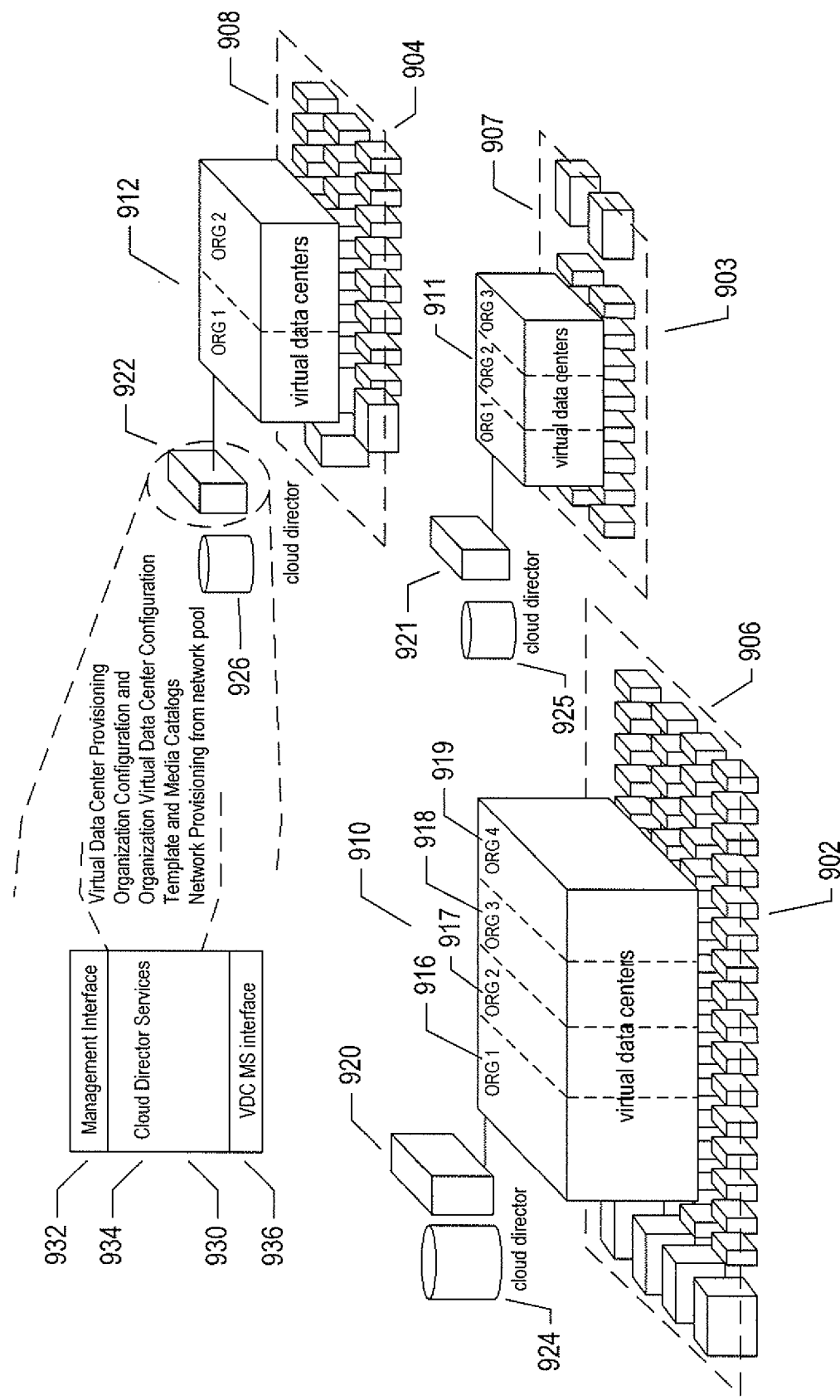
FIG. 9 illustrates a cloud-director level of abstraction.

FIG. 9 illustrates a cloud-director level of abstraction. In FIG. 9, three different physical data centers 902-904 are shown below planes representing the cloud-director layer of abstraction 906-908. Above the planes representing the cloud-director level of abstraction, multi-tenant virtual data centers 910-912 are shown. The resources of these multi-tenant virtual data centers are securely partitioned in order to provide secure virtual data centers to multiple tenants, or cloud-services-accessing organizations. For example, a cloud-services-provider virtual data center 910 is partitioned into four different tenant-associated virtual-data centers within a multi-tenant virtual data center for four different tenants 916-919. Each multi-tenant virtual data center is managed by a cloud director comprising one or more cloud-director servers 920-922 and associated cloud-director databases 924-926. Each cloud-director server or servers runs a cloud-director virtual appliance 930 that includes a cloud-director management interface 932, a set of cloud-director services 934, and a virtual-data-center management-server interface 936. The cloud-director services include an interface and tools for provisioning multi-tenant virtual data center virtual data centers on behalf of tenants, tools and interfaces for configuring and managing tenant organizations, tools and services for organization of virtual data centers and tenant-associated virtual data centers within the multi-tenant virtual data center, services associated with template and media catalogs, and provisioning of virtualization networks from a network pool. Templates are virtual machines that each contains an OS and/or one or more virtual machines containing applications. A template may include much of the detailed contents of virtual machines and virtual appliances that are encoded within OVF packages, so that the task of configuring a virtual machine or virtual appliance is significantly simplified, requiring only deployment of one OVF package. These templates are stored in catalogs within a tenant's virtual-data center. These catalogs are used for developing and staging new virtual appliances and published catalogs are used for sharing templates in virtual appliances across organizations. Catalogs may include OS images and other information relevant to construction, distribution, and provisioning of virtual appliances.

Considering FIGS. 7 and 9, the VDC-server and cloud-director layers of abstraction can be seen, as discussed above, to facilitate employment of the virtual-data-center concept within private and public clouds. However, this level of abstraction does not fully facilitate aggregation of single-tenant and multi-tenant virtual data centers into heterogeneous or homogeneous aggregations of cloud-computing facilities.

Figure 10:
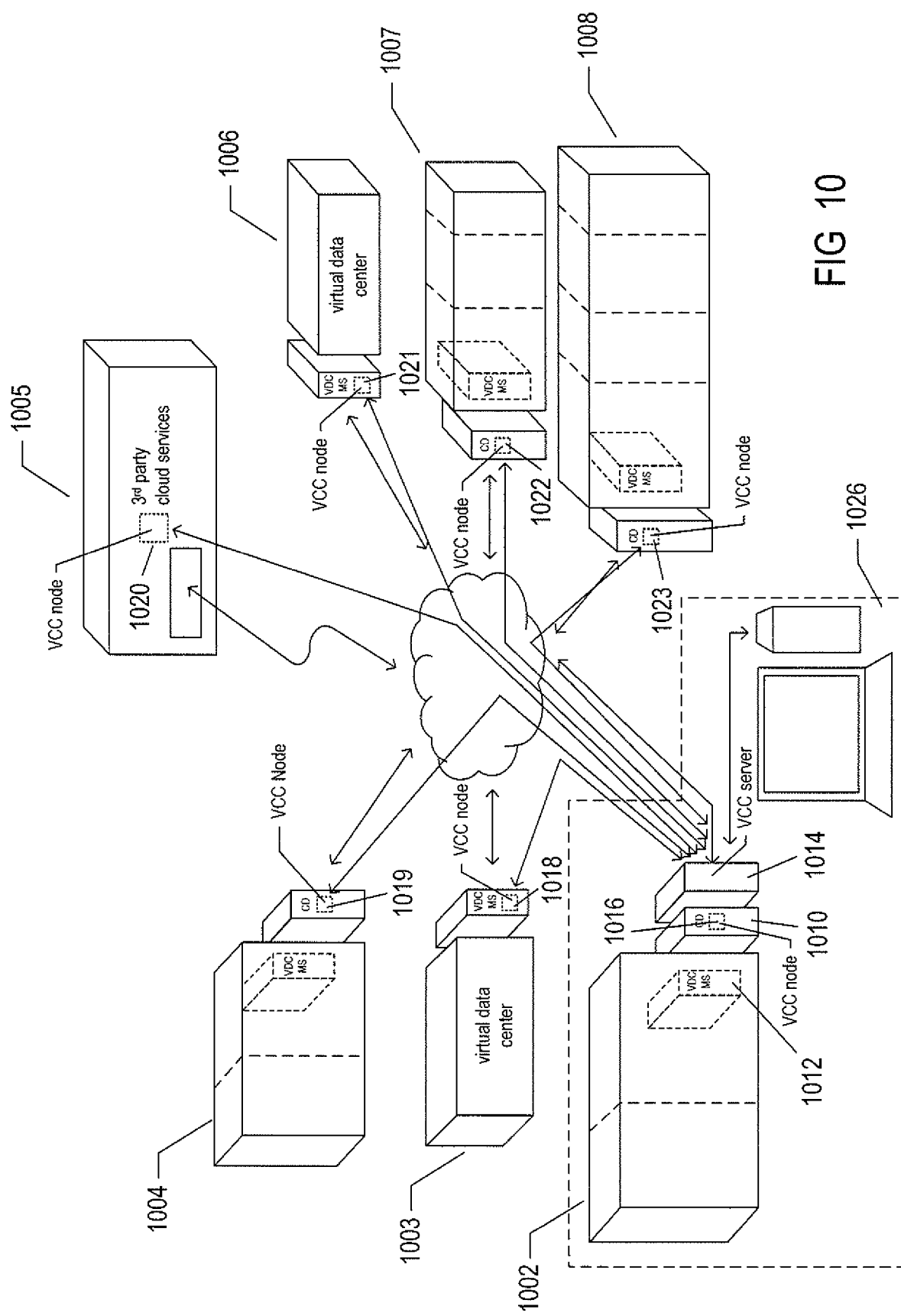
FIG. 10 illustrates virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds.

FIG. 10 illustrates virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds. VMware vCloud™ VCC servers and nodes are one example of VCC server and nodes. In FIG. 10, seven different cloud-computing facilities are illustrated 1002-1008. Cloud-computing facility 1002 is a private multi-tenant cloud with a cloud director 1010 that interfaces to a VDC management server 1012 to provide a multi-tenant private cloud comprising multiple tenant-associated virtual data centers. The remaining cloud-computing facilities 1003-1008 may be either public or private cloud-computing facilities and may be single-tenant virtual data centers, such as virtual data centers 1003 and 1006, multi-tenant virtual data centers, such as multi-tenant virtual data centers 1004 and 1007-1008, or any of various different kinds of third-party cloud-services facilities, such as third-party cloud-services facility 1005. An additional component, the VCC server 1014, acting as a controller is included in the private cloud-computing facility 1002 and interfaces to a VCC node 1016 that runs as a virtual appliance within the cloud director 1010. A VCC server may also run as a virtual appliance within a VDC management server that manages a single-tenant private cloud. The VCC server 1014 additionally interfaces, through the Internet, to VCC node virtual appliances executing within remote VDC management servers, remote cloud directors, or within the third-party cloud services 1018-1023. The VCC server provides a VCC server interface that can be displayed on a local or remote terminal, PC, or other computer system 1026 to allow a cloud-aggregation administrator or other user to access VCC-server-provided aggregate-cloud distributed services. In general, the cloud-computing facilities that together form a multiple-cloud-computing aggregation through distributed services provided by the VCC server and VCC nodes are geographically and operationally distinct.

Probability-Distribution-Based Analysis of Log-File Entries

Figure 11:
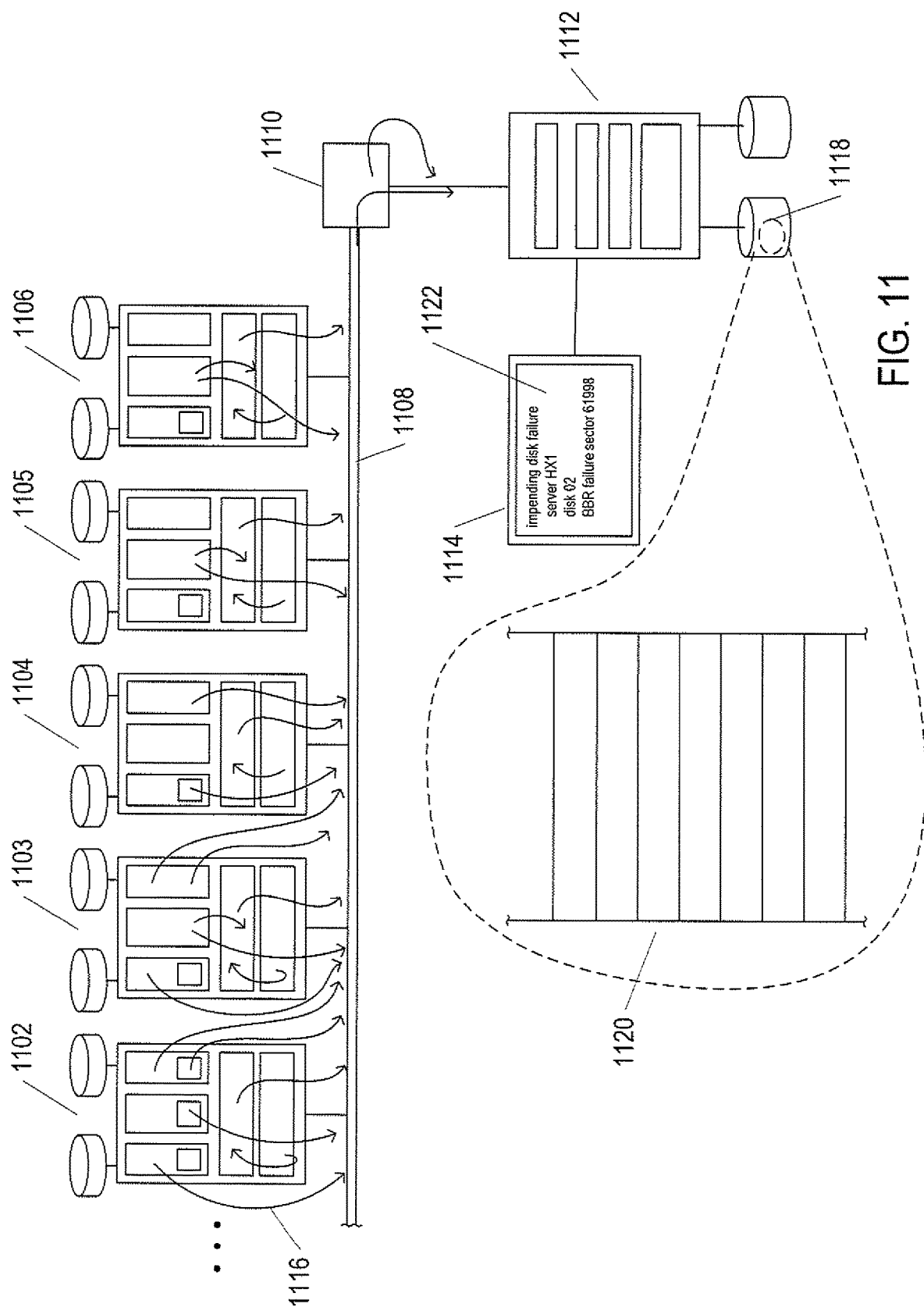
FIG. 11 illustrates a simple example of event-message logging and analysis.

FIG. 11 illustrates a simple example of event-message logging and analysis. In FIG. 11, a number of computer systems 1102-1106 within a distributed computing system are linked together by an electronic communications medium 1108 and additionally linked through a communications bridge/router 1110 to an administration computer system 1112 that includes an administrative console 1114. As indicated by curved arrows, such as curved arrow 1116, multiple components within each of the discrete computer systems 1102 and 1106 as well as the communications bridge/router 1110 generate event messages which are ultimately transmitted to the administration computer 1112. Event messages may be relatively directly transmitted from a component within a discrete computer system to the administration computer or may be collected at various hierarchical levels within a discrete computer and then forwarded from an event-message-collecting entity within the discrete computer to the administration computer. The administration computer 1112 may filter and analyze the received event messages, as they are received, in order to detect various operational anomalies and impending failure conditions. In addition, the administration computer collects and stores the received event messages in a data-storage device or appliance 1118 as large event-message log files 1120. Either through real-time analysis or through analysis of log files, the administration computer may detect operational anomalies and conditions for which the administration computer displays warnings and informational displays, such as the warning 1122 shown in FIG. 11 displayed on the administration-computer display device 1114.

FIG. 12 shows a small, 11-entry portion of a log file from a distributed computer system. In FIG. 12, each rectangular cell, such as rectangular cell 1202, of the portion of the log file 1204 represents a single stored event message. In general, event messages are relatively cryptic, including generally only one or two natural-language sentences or phrases as well as various types of file names, path names, and, perhaps most importantly, various alphanumeric parameters. For example, log entry 1202 includes a short natural-language phrase 1206, date 1208 and time 1210 parameters, as well as a numeric parameter 1212 which appears to identify a particular host computer.

It should be noted that the phrase "log file" is not intended to mean only operating-system-provided data-storage files, but includes any of many different types of event-message sources. Although, in many cases, event messages are stored in files, they may be alternatively streamed from event-message sources to administrative computers and other event-message sinks within a distributed computer system, stored and transferred in shared memory and distributed shared memory, or stored on physical media that is physically transported from a source computer to a receiving computer, It is convenient, in the following discussion, to diagram and discuss log files as files of log entries that each corresponds to an event message, but, in fact, there are many different types of sources of log-file entries.

There are a number of reasons why event messages, particularly when accumulated and stored by the millions in event-log files or when continuously received at very high rates during daily operations of a computer system, are difficult to automatically interpret and use. A first reason is the volume of data present within log files generated within large, distributed computing systems. As mentioned above, a large, distributed computing system may generate and store terabytes of logged event messages during each day of operation. This represents an enormous amount of data to process, even were the individual event messages highly structured and precisely formatted to facilitate automated processing. However, event messages are not so structured and formatted, which is a second reason that continuously received event messages and event logs are difficult to automatically interpret and analyze. They are even more difficult to manually analyze and interpret, by human system administrators and system analysts. Event messages are generated from many different components and subsystems at many different hierarchical levels within a distributed computer system, from operating system and application-program code to control programs within disk drives, communications controllers, and other such distributed-computer-system components. The event messages may be generated according to a variety of different event-message structuring and formatting approaches used by various different vendors and programmers. Even within a given subsystem, such as an operating system, many different types and styles of event messages may be generated, due to the many thousands of different programmers who contribute code to the operating system over very long time frames. A third reason that it is difficult to process and analyze event messages is that, in many cases, event messages relevant to a particular operational condition, subsystem failure, or other problem represent only a tiny fraction of the total number of event messages that are received and logged. Searching for these relevant event messages within an enormous volume of event messages continuously streaming into an event-message-processing-and-logging subsystem of a distributed computer system may itself be a significant computational challenge. While text-search methodologies may be employed to search for relevant data within large log files, such methods are generally quite time-consuming and imprecise.

Figure 13:
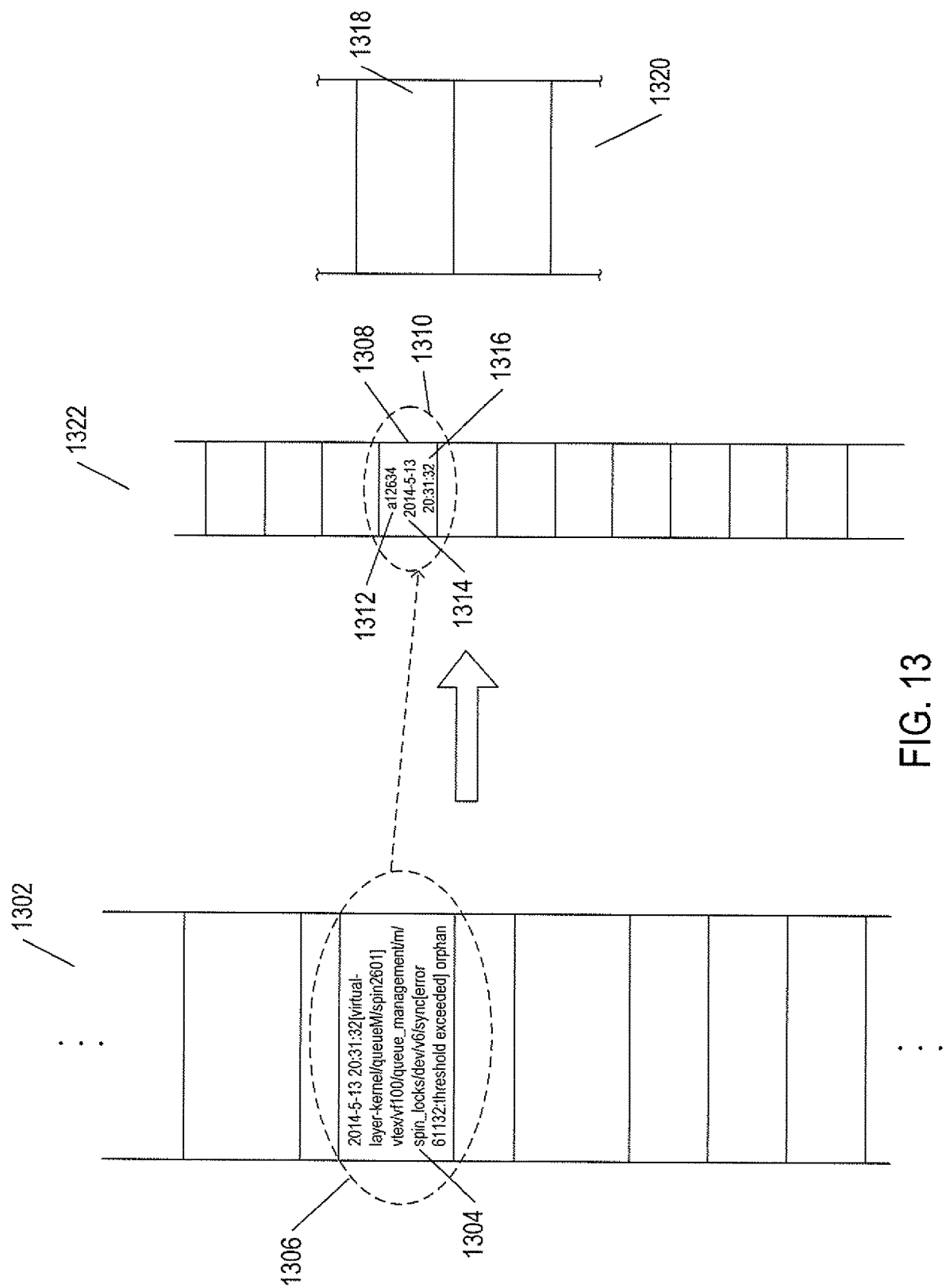
FIG. 13 illustrates the event-message-processing approach represented by the currently disclosed methods and systems.

FIG. 13 illustrates one event-message-processing method. In FIG. 13, a traditional event log 1302 is shown as a column of event messages, including the event message 1304 shown within inset 1306. The methods and systems to which the current document are directed automatically process event messages, as they are received, in order to transform the received event messages into event records, such as event record 1308 shown within inset 1310. The event record 1308 includes a numeric event-type identifier 1312 as well as the values of parameters included in the original event message. In the example shown in FIG. 13, a date parameter 1314 and a time parameter 1315 are included in the event record 1308. The remaining portions of the event message, referred to as the "non-parameter portion of the event message," is separately stored in an entry in a table of non-parameter portions that includes an entry for each type of event message. For example, entry 1318 in table 1320 may contain an encoding of the non-parameter portion common to all event messages of type a12634 (1312 in FIG. 13). Thus, event messages may be somewhat compressed and stored as event records in log files. Many other types of processing may be carried out to standardize and normalize event messages in order to produce log files with log entries having a uniform format. For the purposes of describing the virtual-log-file system, it is assumed that the physical log files within a distributed computer system include normalized log-file entries. When this is not the case, log-file entries ingested by the virtual-log-file system may be initially normalized and efficiently stored by the virtual-log-file system to facilitate virtual-log-file-system operations.

The event-record log, such as event-record log 1322, and other types of accumulations of event records have numerous advantages over a traditional event-message log. A first advantage is that each event record is typed. Because the event records are typed, the event-record log can be easily searched, partitioned, and otherwise processed based on event-message types, which produces a significant computational advantage for downstream event-analysis and event-interpretation systems. A second advantage is that, as shown in FIG. 13, event-record logs are significantly compressed with respect to traditional event-message logs. Because only one copy of the non-parameter portion of each type of event message needs to be stored in the associated table, a significant data compression is achieved by the methods and systems to which the current document is directed. The compression ratios achieved depend on the average ratio of non-parameter characters to parameter characters in event messages. In many cases, compression ratios of between 2:1 and 10:1 can be achieved by storing event records rather than event messages. Because terabytes of event messages may be collected on a daily basis within a large, distributed computing system, this potential rate of data compression represents a significant decrease in computational and hardware-usage overheads. A third advantage of event-record logs in comparison to event-message logs is that the event-record logs are fully and uniformly structured, which additionally facilitates downstream automated analysis and interpretation. The downstream analysis and interpretation systems directly acquire relevant parameters and an event type from an event record, without the need for parsing and typing a large variety of different types of event messages.

Figure 14A:
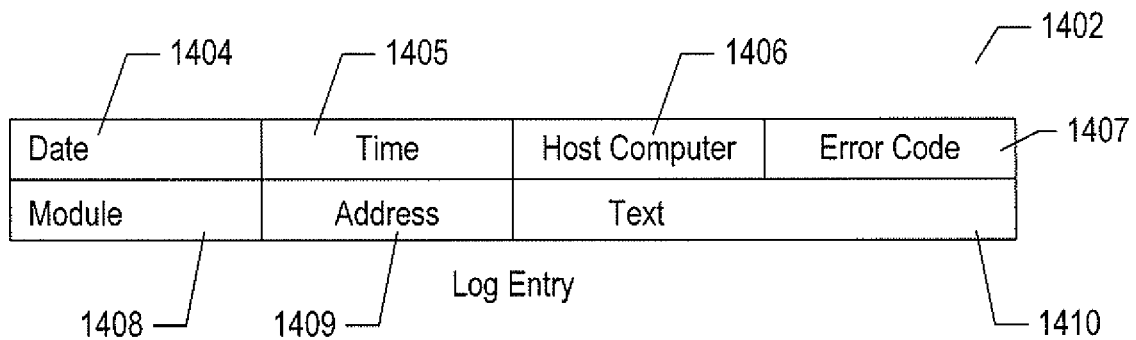
FIGS. 14A-C illustrate a simplified picture of log entries and log files that is used in the remaining discussion of the virtual log file to which the current application is directed.
Figure 14B:
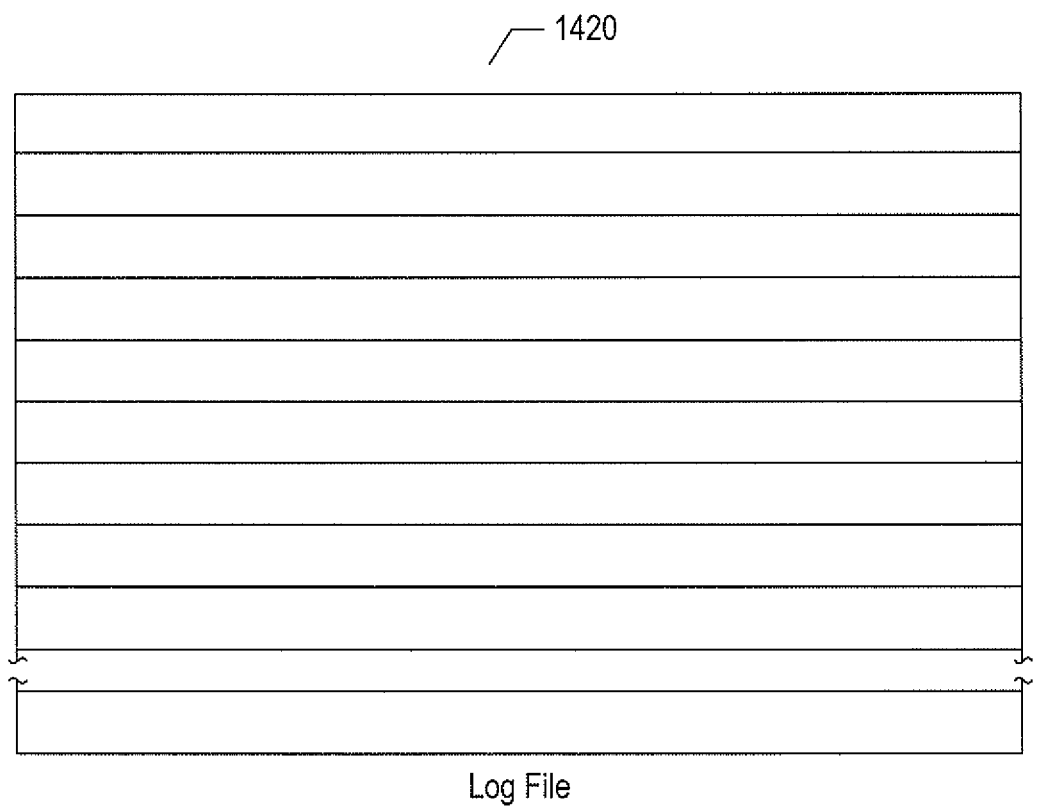
Figure 14C:
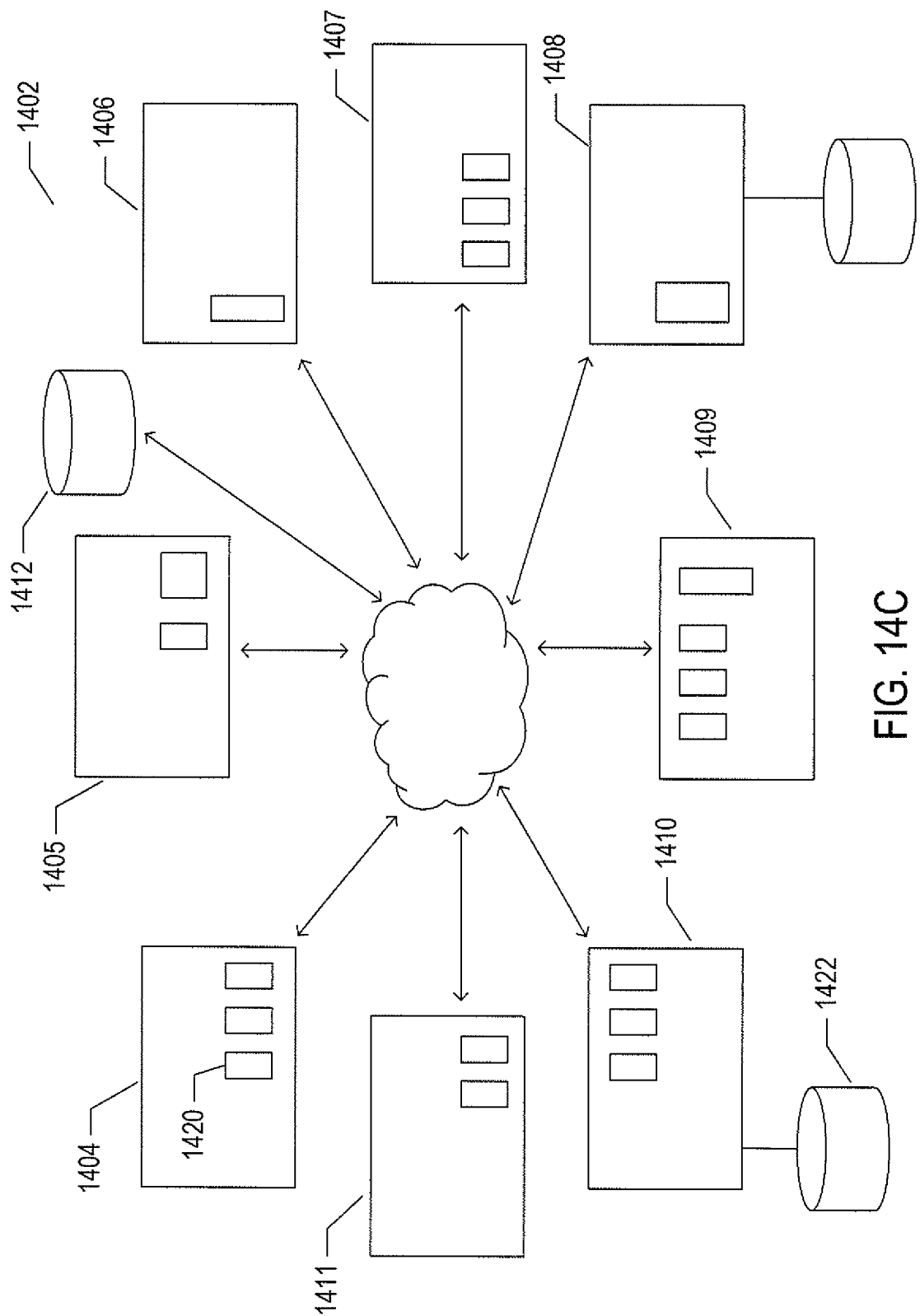

FIGS. 14A-C illustrate a simplified picture of log entries and log files that is used in the remaining discussion of the virtual-log-file system to which the current application is directed. As shown in FIG. 14A, log-file entries, such as entry 1402, are short alphanumeric records that include various different fields. These fields include a date 1404, a time 1405, an identifier for the host computer 1406 which generated the log entry, an error code, also referred to as an "event type" 1407, an identifier of the module that includes the executable instructions that generated the log entry 1408, an address of a point in the module where the executable instructions reside 1409, and a potentially lengthier text field that includes a description of the event, error, anomaly, or other occurrence represented by the log entry 1410. There may be many additional fields in actual log entries stored in log files of different types of computer systems. Log-file entries may have various different formats, encodings, field orders, natural languages, and other differences. In many cases, the log entries collected within log files of a distributed computer system are somewhat standardized based on the operating systems, virtualization layers, and types of application programs running within the distributed system. As discussed above, additional standardization and normalization may occur during processing of error messages input to a logging subsystem within computer systems and components of computer systems and may be carried out by the virtual-log-file system to which the current application is directed when ingesting log entries from physical log files.

As shown in FIG. 14B, a physical log file 1420 can be thought of as a stored sequence of log entries. Any of many different types of files and file structures can be used for log files. Log files may be simple, flat files containing unstructured text that is processed, during file-access operations, into arrays or streams of log entries. Alternatively, log entries may be records within structured files. While traditional random-access files are conveniently used for storing log entries, log files may also be stored on underlying physical media that can be only sequentially read and processed. However, in all cases, standardized physical-log-file-access interfaces can be developed to provide logical physical log files that each consists of a sequence of standardized log entries, as shown in FIGS. 14A-B.

As shown in FIG. 14C, physical log files and, in certain cases, archived log files are generally distributed throughout a large distributed computer system. In FIG. 14C, the distributed computer system 1402 includes eight different discrete computer systems 1404-1411, a stand-alone archive of log-file entries 1412, and numerous log files, such as log file 1420 in discrete computer system 1404 and archived log files, such as archived log files 1422 contained within, or accessed from, discrete computer system 1410. In fact, in many large distributed computing systems, there may be hundreds, thousands, or more discrete computer systems and processor-controlled devices and tens of hundreds to many tens of thousands or more individual sources for log-file entries stored within thousands of log files distributed throughout the components of the distributed computer system.

Figure 15:
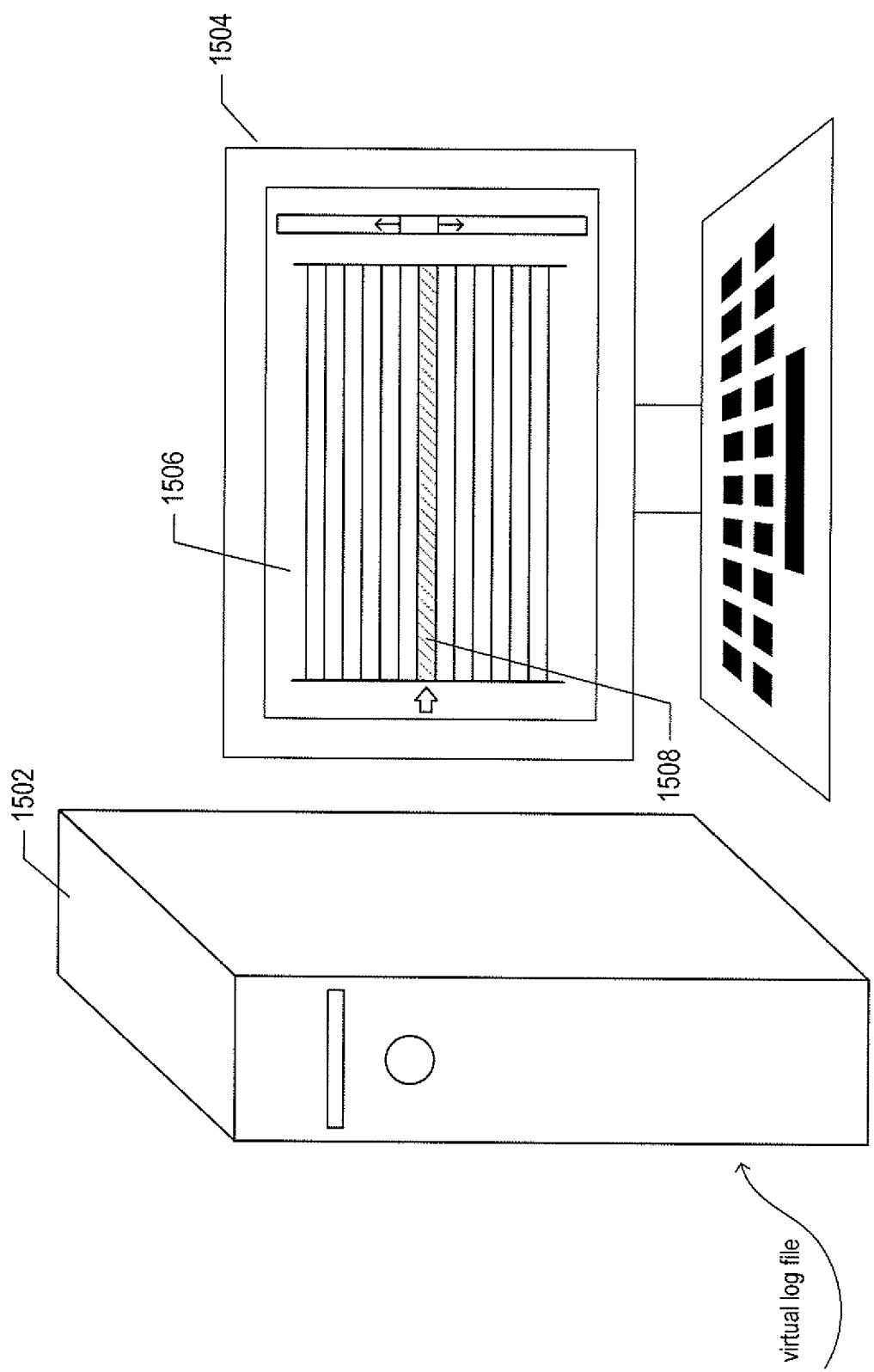
FIG. 15 shows a log-file analysis system that may be used, by a system administrator or other personnel responsible for configuring and maintaining a distributed computing system, to view the contents of the many logs files that may be stored and continuously updated within a distributed computing system.

FIG. 15 shows a log-file analysis system that may be used, by a system administrator or other personnel responsible for configuring and maintaining a distributed computing system, to view the contents of the many logs files that may be stored and continuously updated within a distributed computing system. The contents of the many different log files may be merged together, by merge/sort operations, to produce a virtual log file that is accessed by a log-file-analytics application running on a local computer 1502. The log-analytics application displays, on a user display device 1504, a browser-like user interface 1506 that shows, at any given time, a small portion of the log entries, such as log entry 1508, present within the virtual log file. In addition, the log-analytics application may provide for numerous different types of computational analysis and processing of log-file entries in order to generate a variety of different statistics, graphical representations of the contents of log files, and other information. In many cases, either the log-analytics system, or monitoring subsystems of the distributed computing system, may monitor the contents of the log files within a distributed computing system in order to detect anomalous situations, indications of potential problems, and other such occurrences and automatically generate alarms and warning notifications to automated failure-detection and amelioration subsystems as well as to human administrators and other personnel.

The current document is directed to methods that are incorporated within automated monitoring subsystems, log-analysis systems, and other systems and subsystems in order to detect distributed-computing-system state changes, indications of potential problems and failures, and other problem-associated conditions based on the contents of log files. In general, the analysis of log-file entries to detect such occurrences is fraught with complexities and difficulties. In many large distributed computing systems, terabytes of log-file data are generated on a daily basis. There may be thousands, tens of thousands, or more different types of recorded events within log files, and thousands, tens of thousands, or more occurrences of any particular type of event within the log files generated on an hourly or daily basis. In many approaches to the analysis of log-file entries, various types of graph-based methods may be applied to recognize patterns and trends within the voluminous and noisy log-file data. Naïve approaches may rely on detecting particular types of log entries, such as log entries associated with urgent or critical statuses. However, such naïve methods often fail to detect impending problems until the problems have reached a level of seriousness and pervasiveness that amelioration of the problems may involve significant temporal overheads, computational burdens, down time, and large-scale hardware-component substitutions and replacements. The current document is directed, in part, to methods, incorporated within automated subsystems and log-analytics systems, that rely on recognizing impending failures, problems, and anomalous conditions based on aggregate properties of log-file-entry subsets.

Figure 16A:
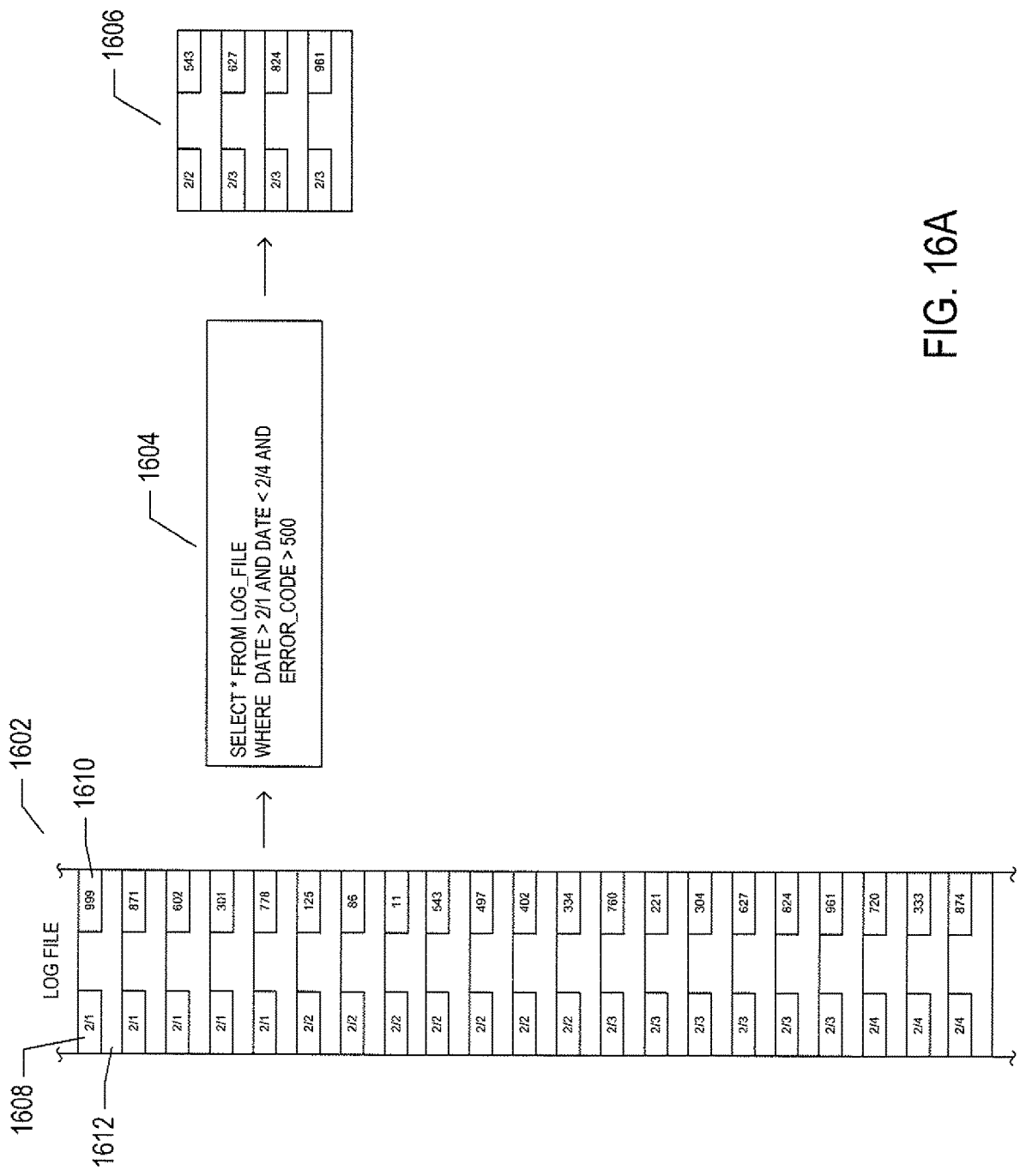
FIGS. 16A-B illustrate generation of event distributions from log-file entries.
Figure 16B:
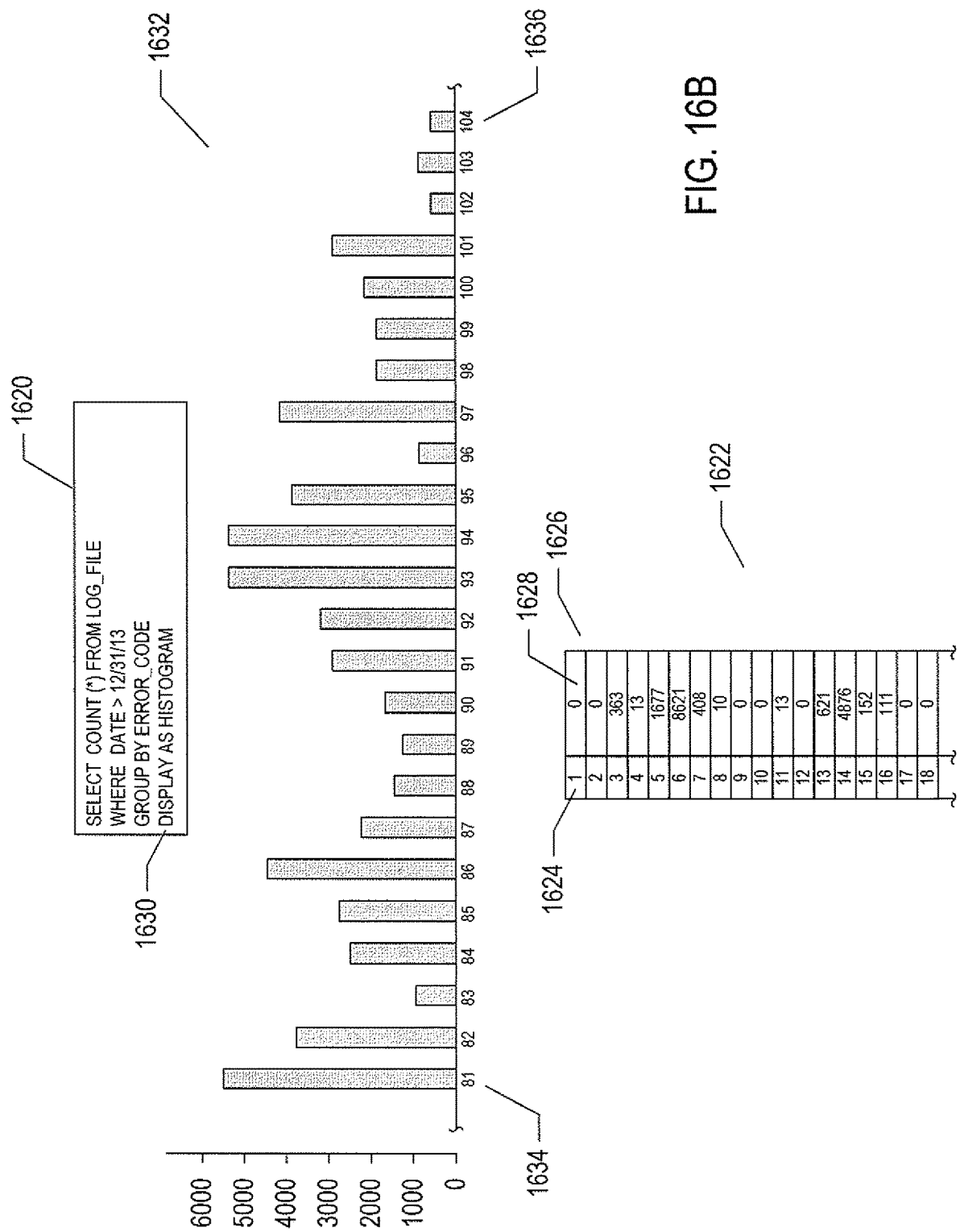

FIGS. 16A-B illustrate generation of event distributions from log-file entries. As shown in FIG. 16A, a log file 1602, such as an individual log file or a virtual log file that represents the contents of many individual log files within a distributed computing system, may be treated as a database of log-file entries. Queries, such as query 1604, may be executed against the contents of a log file or virtual log file to produce a subset 1606 of log-file entries that correspond to the constraints specified in the query. Another way of looking at the query-execution process is that the query 1604 operates as a filter to select, or accept, only a subset 1606 of the total number of entries within a log file or virtual log file 1602. In the example shown in FIG. 16A, the query 1604 is shown in a structured-query-language ("SQL") form, as commonly used in relational-database queries. In the simple example shown in FIG. 16A, the date and error_code fields of simplified log entries are shown with example values, such as the date field containing the date "2/1" 1608 and the error_code field containing the error code "999" 1610 in log-file entry 1612. Query 1604 selects, from the log file, those entries for which the date field is greater than 2/1 and less than 2/4 and for which the error_code field has a value greater than 500. Of the log-file entries displayed in the portion of the log-file shown in FIG. 16A, only the four entries in the subset of log-file entry 1606 meet the constraints of the query 1604.

As shown in FIG. 16B, a query 1620 can be used to select the number of log-file entries for each different possible error code. The result of the query can be viewed as a table 1622, each row of which contains the indication of an error code, such as the error code "1" 1624 in the first row 1626 of the table, and a field containing the count of the number of log-file entries with that error code, such as the count "0" 1628 in the first row 1626 of the table 1622. Query 1620 also includes a directive 1630 "DISPLAY AS HISTOGRAM." This results, in one implementation, in the display of a histogram-like plot 1632 of the number of log-file entries for each of the possible error codes. Only a portion of the plot is shown in FIG. 16B that includes vertical-bar representations of the counts of the error codes from "81" 1634 to "104" 1636.

A histogram, such as histogram 1632, or a table of counts for the different error codes, such as table 1622, are readily converted into probability distributions. The count for any particular error code divided by the total counts for all of the error codes is the probability that a log-file entry with that error code would be selected at random from the entries within the log file from which the histogram or table is generated. The sum of all of the probabilities for the different error codes is 1.0, consistent with the definition of a discrete probability distribution. Thus, a SELECT query with a "GROUP BY ERROR CODE" clause provides the raw data for generation of a distribution of error_code types within all or a defined subset of the entries of a log file or virtual log file.

In the current document, the histogram plots of error-code counts and the counts of the different types of error codes divided by the total counts are referred to as "probability distributions." They are probability distributions in the sense that, were one to define a discrete random variable E representing the error code in a sampled log entry, then $P(E=e)$, where e is a particular error code, is computed for a set of N log entries as the number of entries with error code e divided by N. However, these are discrete, rather than continuous probability distributions, and the process by which they are generated is not random sampling. Furthermore, these are simply the distribution of error codes in a set of log entries selected from one or more log files. The distribution generated from a set of log entries does not necessarily have any predictive relationship to other log entries. Thus, it might be more accurate to refer to these computed distributions as "quasi-probability distributions." It is important to note that the order in which the counts of error-code types is displayed has no significance. The order of the histogram bars in histogram 1632 in FIG. 16B or the orders of the rows in table 1622 in FIG. 16B can be arbitrarily reordered without affecting the analyses of these quasi-probability distributions, discussed below, or the use of these quasi-probability distributions for monitoring state changes within a distributed computer system. In general, the order of error codes does not reflect relative properties of error codes. For example, the fact that the error codes for two errors are adjacent in a numerical ordering of the error codes generally does not imply that the errors are related or more related than error with error codes displaced by a large distance in the numerical ordering. The error codes thus do not generally have a meaningful ordering. Peak-like features in histogram 1632 in FIG. 16B, for example, have no significance with respect to the use of the data in monitoring state changes within a distributed computer system. However, when the histogram bars are consistently numerically ordered by error code, visual comparison of two histograms can reveal differences in the distribution of error codes within two different sets of log entries. The significant features are disparities in the heights of histogram bars associated with a particular error code.

Queries, such as query 1620 in FIG. 16B, can be used to select counts for the different types of events or error codes within log-file entries that represent various subsets of log-file entries available for analysis. In many cases, the subsets of log-file entries are obtained by query logic that selects a subset of queries created or received during a particular time interval. However, in other cases, the subsets may be alternatively specified. As one example, a subset may include log-file entries generated by a particular computer system or a particular subsystem within a particular computer system. Furthermore, the queries may be further restricted to select counts for only a subset of all of the possible event types or error codes. In certain cases, discussed below, the probability distributions generated from such queries provide a type of fingerprint or snapshot of the state of a log file or log files for particular intervals in time. By comparing these distributions, changes in the state of the log files, which reflect changes in the state of a distributed system, can be detected between different periods of time. In other cases, the distributions may serve as fingerprints for particular computer systems, for particular types of operational characteristics or behaviors, and for essentially any arbitrary conditions, time intervals, localities, or other phenomenon on the basis of which the subsets of log-file entries from which the probability distributions were specified. In other words, comparing the probability distributions generated from the results of two queries carried out on a large set of available log-file-entries provides insight as to the similarity or dissimilarity between characteristics of the subsets of log-file-entries specified in the queries.

Figure 17A:
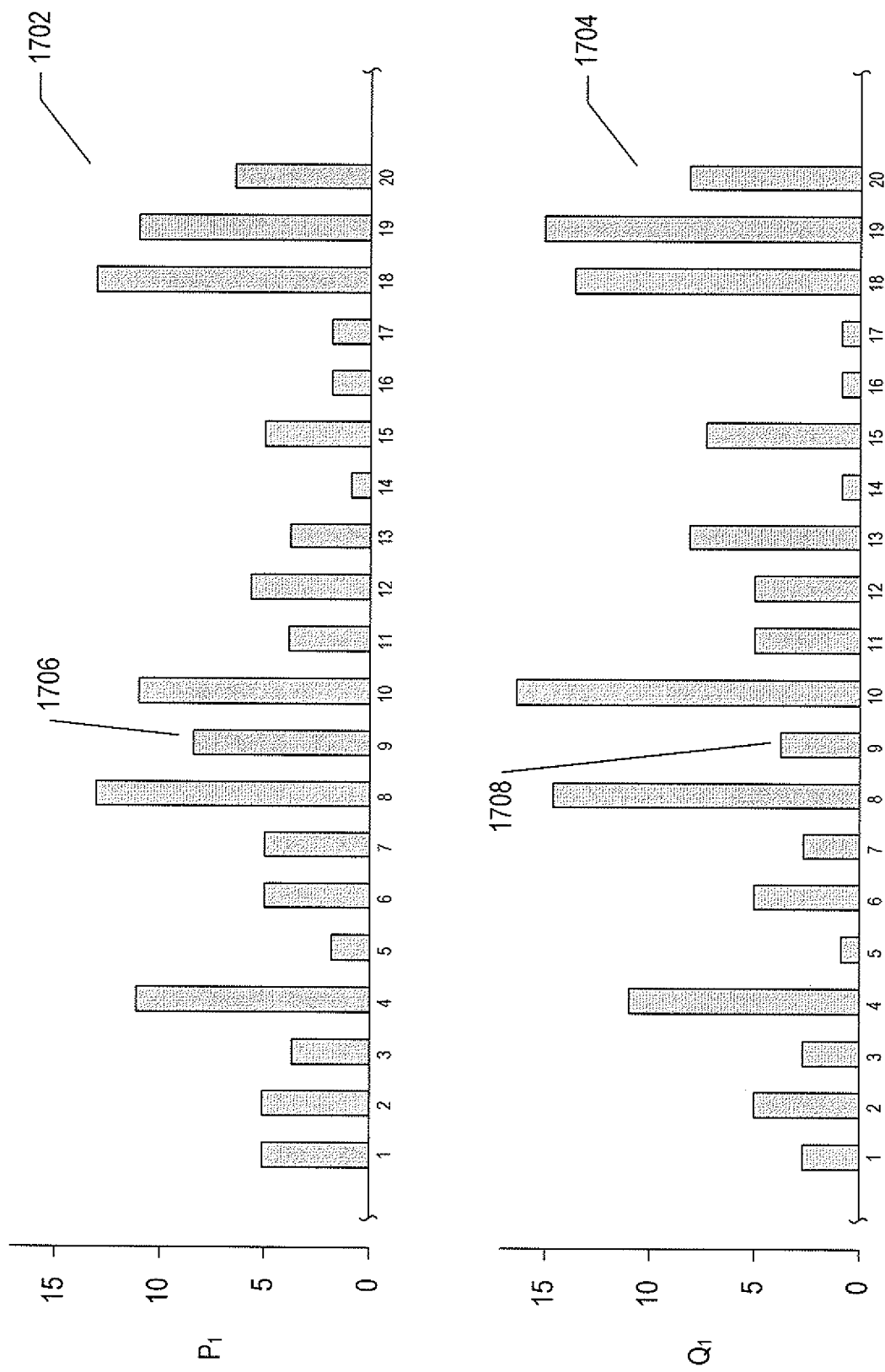
FIGS. 17A-B show event-type histograms collected from different time intervals using queries, such as query 1620 in FIG. 16B, executed against one or more log files or virtual files.
Figure 17B:
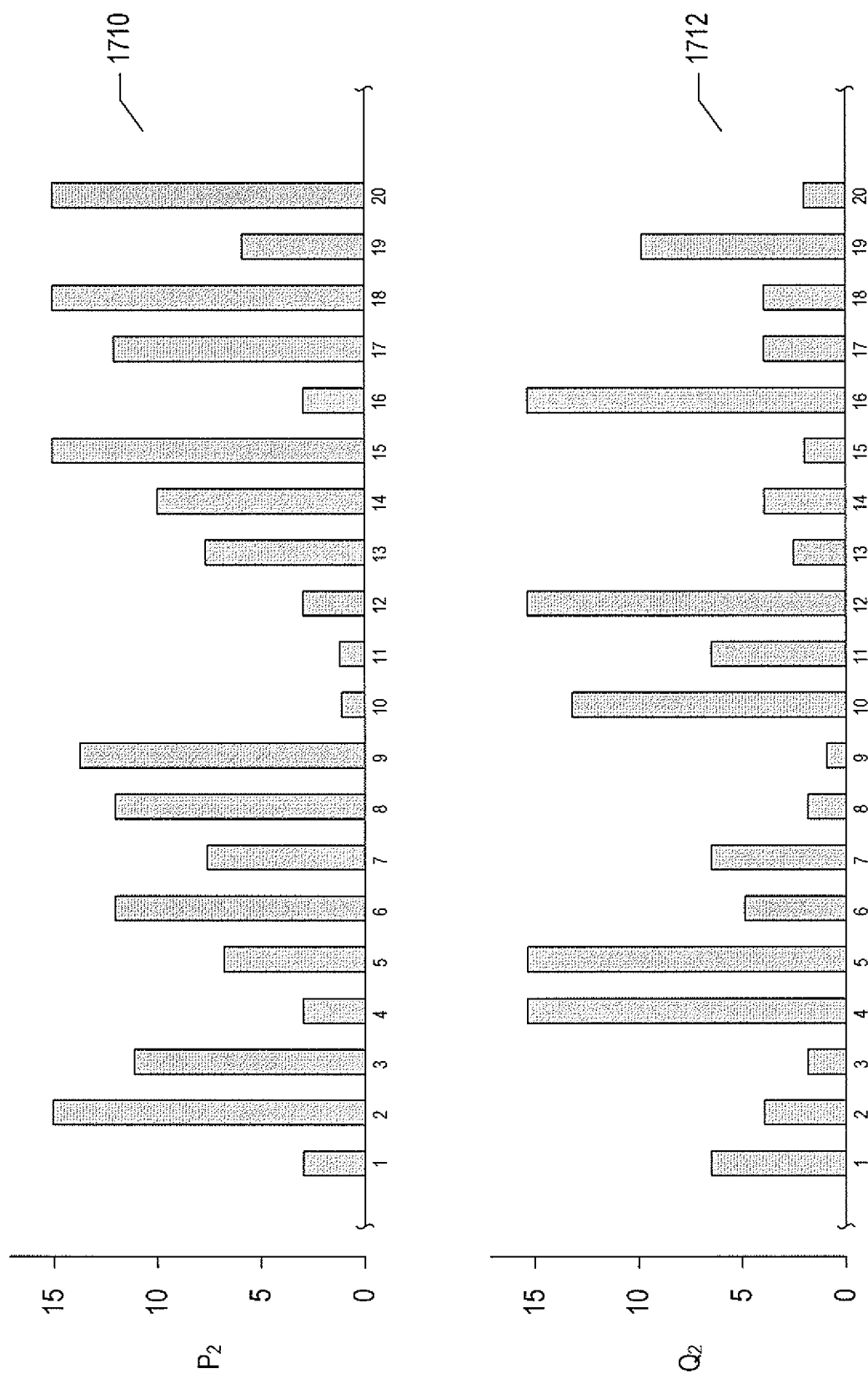

FIGS. 17A-B show event-type histograms collected from different time intervals using queries, such as query 1620 in FIG. 16B, executed against one or more log files or virtual files. In FIG. 17A, a first histogram 1702, corresponding to a probability distribution $1)_1$ of event types, or error-code values, is generated from log-file entries collected during a first interval of time and second histogram 1704, corresponding to a second probability distribution $Q_1$, is generated from log-file entries selected from a log file or virtual log file with respect to a second time interval. In this example, and in subsequent examples, only a small number, 20, of error code types or event types are considered. A visual comparison of the two histograms reveals that, for the most part, they reflect similar probability distributions. There are differences. For example, the count of log-file entries with event type "9" 1706 in the histogram 1702 corresponding to the probability distribution $P_1$ is significantly greater than the count 1708 for log-file entries with error_code value "9" and the second histogram 1704 corresponding to probability distribution $Q_1$. Nonetheless, the overall shapes of the two histograms are visually similar. Thus, one might conclude, from visual inspection, that the states of the distributed computing system reflected in the log-file entries for the two periods of time are similar. By contrast, FIG. 17B shows two different histograms 1710 and 1712 based on queries against log-file entries of two different time intervals and corresponding to the two different probability distributions $P_2$ and $Q_2$. In this second case, the two histograms differ significantly, and one would likely conclude, based on visual inspection, that the states of the distributed computing system in these two different time intervals, as reflected in probability distributions $P_2$ and $Q_2$, are quite different.

A log-file analytics application may allow an administrator or other user to generate probability distributions and display them as histograms from log-file entries selected for different time intervals, much as the pairs of histograms are displayed in FIG. 17A-B. This would provide a useful graphical visualization of the states of the distributed computer system from which the log-file entries are gathered over different periods of time. Visual comparison often provides a powerful analytical tool to human users. Of course, as discussed above, only comparison of the heights of histogram bars for a particular error code has significance. The ordering of the histogram bars and apparent peaks and other features in the displayed histogram have no significance. Nonetheless, when the histogram bars are identically ordered, for example, in ascending error-code numerical order, visual comparison can provide a quick type of analysis to look for significant differences between error-code-distribution fingerprints computed for different time intervals. However, the examples shown in FIGS. 17A-B are very simple examples featuring a very small number of different event types or error codes. In an actual system, as pointed out above, there may be thousands, tens of thousands, or more different event types or error codes. Furthermore, the data may appear quite noisy and many of the differences may be relatively subtle and difficult to discern when visually displayed as histograms. In many cases, log-file analyses need to be fully automated and incorporated into subsystems of a distributed computing system. For automated systems, visual comparison of histograms is clearly an inefficient approach to discerning differences in the states of a distributed computing system over different periods of time. Furthermore, visual display of the distributions may inadvertently lead system administrators to make unwarranted assumptions and conclusions from insignificant, but visually apparent, features in the histogram, as discussed above. For these reasons, a numeric method is desirable for determining the extent that two different event-type or error-code probability distributions generated from log-file entries differ.

Figure 18A:
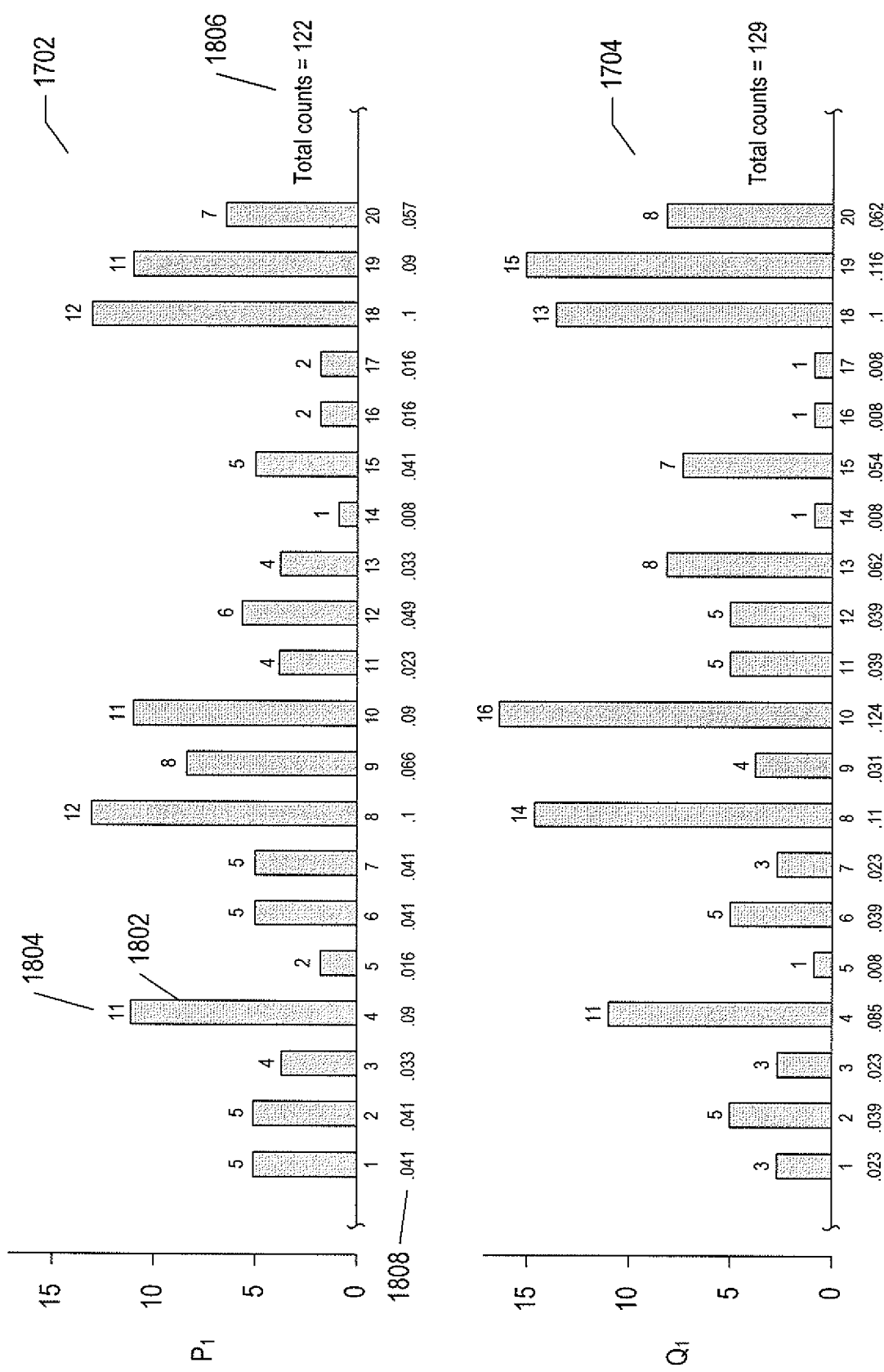
FIGS. 18A-B illustrate conversion of the histograms shown in FIG. 17A-B into numeric probability distributions.
Figure 18B:
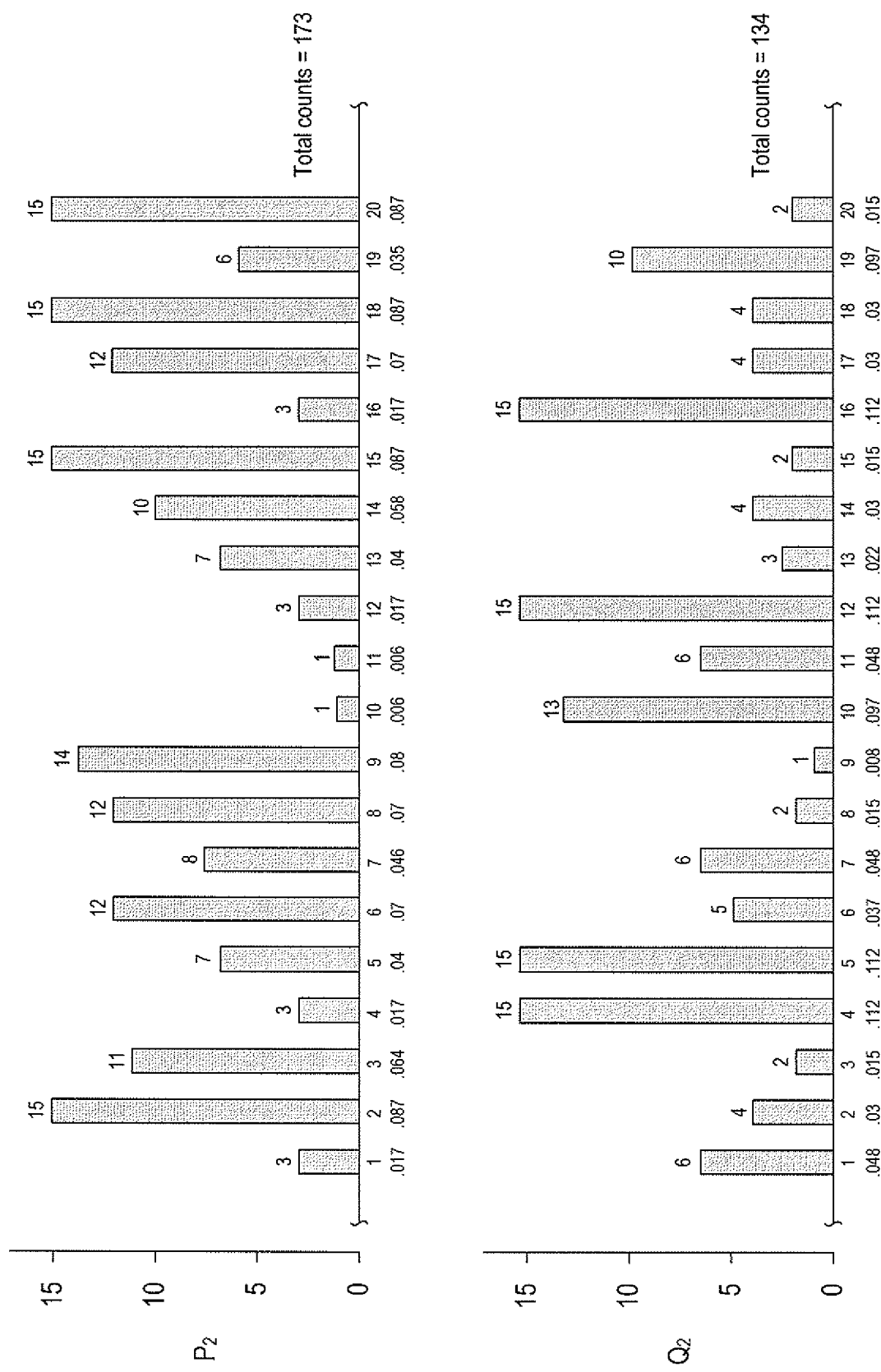

FIGS. 18A-B illustrate conversion of the histograms shown in FIG. 17A-B into numeric probability distributions. FIG. 18A shows histograms 1702 and 1704 from FIG. 17A.

Above each vertical histogram bar, such as vertical histogram bar 1802, the count or number of log-file entries with the particular event type or containing the particular error code is provided as an integer, such as the integer "11" 1804 indicating that vertical histogram bar 1802 represents the fact that 11 log-file entries containing the error code value 4 were observed in the time interval from which the log-file entries were selected. All of the counts represented by all of the vertical histogram bars are added together to produce a total-count or total-number value 1806. Then, the count corresponding to each vertical bar is divided by the total counts to produce the probability value for each different error_code value. These probabilities are shown as a horizontal line of values 1808 below the histogram, each probability value corresponding to a particular error_code value. The sum of the probability values is 1.0.

One measure of the similarity or difference of two probability distributions, such as those generated in FIG. 18-B, is referred to as the Kullbach-Leibler divergence. Expressions for the Kullbach-Leibler divergence are provided below:

$$D_{KL}(P\|Q) = \sum P(i)\log\frac{P(i)}{Q(i)}, \quad (1)$$

$$D_{KL}(Q\|P) = \sum Q(i)\log\frac{Q(i)}{P(i)}. \quad (2)$$

FIG. 19A illustrates calculation of the Kullbach-Leibler divergence for the pairs of probability distributions shown in FIGS. 18A-B. Four two-dimensional arrays 1902-1905 contain the probability-distribution pairs $P_1/Q_1$, $P_2/Q_2$, $Q_1/P_1$, and $Q_2/P_2$ from FIGS. 18A-B in tabular form. Because the error codes monotonically increase, the index of the columns in the two-dimensional arrays correspond to the error codes for which the probabilities are shown in cells of the column. The calculation of the Kullbach-Leibler divergence is illustrated below each two-dimensional array. In a first line 1906, the value $$\frac{P(i)}{Q(i)}$$

is computed for each pair of probabilities in each column. In a second line 1908, the logarithm of the values in the first line 1906 are computed. Logarithms to the base 10 are used, in this example, although logarithms to any base can be used, since a change in the base of the logarithm results only in a scalar multiplier. In general, logarithms to the base 2 are routinely used and, in a following example of a second type of divergence, all calculations use logarithms to the base 2. In a third line 1910, the value of the first probability in each column times the log of the ratio shown in the second line 1908 is computed. The sum of these values 1912 represents the Kullbach-Leibler divergence value for the pair of distributions 1902. The Kullbach-Leibler divergence values for the $P_2/Q_2$ distribution pair 1914, the $Q_1/P_1$ distribution pair 1916, and the $Q_2/P_2$ distribution pair 1918 are also computed and shown in a rightmost column in FIG. 19A.

The Kullbach-Leibler divergence has several significant characteristics. First, inspection of the Kullbach-Leibler-value pairs 1912/1916 and 1914/1918 in FIG. 19A reveal that $D_{KL}(P\|Q) \neq D(Q\|P)$. This is one reason that the computed Kullbach-Leibler metrics are not distances between different probability distributions in a probability-distribution space. The metric from P to Q is not the same as the metric from Q to P. Another characteristic, and in fact, the motivation for using, the Kullbach-Leibler divergence is that the magnitude of the computed Kullbach-Leibler divergence is proportional to the dissimilarity between the two probability distributions. As discussed above with reference to FIG. 17A, the two histograms 1702 and 1704 visually appear similar, and their Kullbach-Leibler metric values of 0.035 and 0.024 (1912 and 1916 in FIG. 19A) are relatively small. By contrast, the two distributions shown as histograms in FIG. 17B, 1710 and 1712, appear to be quite dissimilar, and their Kullbach-Leibler divergence values of 0.368 and 0.407 (1914 and 1918 in FIG. 19A) are much larger than the Kullbach-Leibler divergence values for distributions 1702 and 1704. Thus, the Kullbach-Leibler divergence values for pairs of probability distributions of log-file entries provides a numeric indication of the dissimilarity between two probability distributions.

Unfortunately, the Kullbach-Leibler metric has several characteristics that render it unsuitable for automatic analysis of log-file-entry probability distributions. One drawback is the fact that the Kullbach-Leibler divergence is not symmetric, as discussed above. A more serious drawback is that the Kullbach-Leibler metric cannot tolerate 0-probability values in the probability distributions that are being compared. Note that a 0 value in the denominator of the argument of the log function in the Kullbach-Leibler expressions would result in an improper value. In many cases, if not almost all cases, in which a reasonably large set of different event types or error codes are considered in generating a probability-distribution fingerprint from selected log-file entries, many of the probabilities are generally 0. In other words, when plotted as histograms, the vertical bars would be relatively sparsely arrayed across the horizontal axis.

A second type of metric that can be used to compute a numeric value related to the similarity/difference of two probability distributions is called the "Jensen-Shannon divergence." One expression for the Jensen-Shannon divergence is provided below:

$$JSD(P\|Q) = \frac{1}{2}D_{KL}(P\|M) + \frac{1}{2}D_{KL}(Q\|M) \quad (3)$$

$$\text{where } M = \frac{1}{2}(P|+Q).$$

The Jensen-Shannon Divergence is Symmetrical:

$$JSD(P\|Q) = JSD(Q\|P). \quad (4)$$

The Jensen-Shannon divergence values fall within the real-number range [0,1]:

$$JSD(P\|Q) \in [0,1] \quad (5)$$

A second expression for the Jensen-Shannon divergence is based on the Shannon entropy. The Shannon entropy for a discrete probability distribution P is:

$$H(P) = -\sum_i P(i)\log P(i), \quad (6)$$

where the notation P(i) refers to the probability of the occurrence of event i. The Shannon entropy frequently arises in information theory and is related to the uncertainty with respect to random selection of an event given the probability distribution. For example, the Shannon entropy for a coin with two heads computed from the probability distribution of a head or tail resulting from a coin flip is 0 while the Shannon entropy for a fair, balanced coin with both a head and a tail is 1. The Shannon entropy value of 0 reflects the fact that, for a double-headed coin, there is no uncertainty in the outcome. Also, as noted above:

$$\sum_i P(i) = 1. \tag{7}$$

The second expression for the Jensen-Shannon divergence is:

$$\begin{aligned} JSD &= H\left(\frac{1}{2}P + \frac{1}{2}Q\right) - \frac{1}{2}H(P) - \frac{1}{2}H(Q), \tag{8} \\ &= \sum_i \frac{1}{2}(P(i) + Q(i))\log\left(\frac{1}{2}(P(i) + Q(i))\right) + \\ &\quad \frac{1}{2}\sum_i P(i)\log P(i) + \frac{1}{2}\sum_i Q(i)\log Q(i), \\ &= \frac{1}{2}\sum_i (P(i) + Q(i))\log\frac{1}{2} - \frac{1}{2}\sum_i (P(i) + Q(i))\log(P(i) + \\ &\quad Q(i)) + \frac{1}{2}\sum_i P(i)\log P(i) + \frac{1}{2}\sum_i Q(i)\log Q(i), \\ &= 1 + \frac{1}{2}\left[\sum_i P(i)\log P(i) + \sum_i Q(i)\log Q(i) - \tag{9} \right.\\ &\quad \left. \sum_i P(i)\log(P(i) + Q(i)) - \sum_i Q(i)\log(P(i) + Q(i))\right]. \end{aligned}$$

One interesting characteristic of the Jensen-Shannon divergence computation is that, when either P(i) is 0 or Q(i) is 0, the sum of all the terms for probability i in the four summations within brackets in the expression (9) above, is 0:

When $P(i)=0$, $-P(i)\log(P(i)+Q(i))=0$, $-Q(i)\log(P(i)+Q(i))=-Q(i)\log Q(i)$, $P(i)\log(P(i))=0$, and $Qi \log(Q(i))=Q(i)\log Q(i)$, \hfill (8)

as a result of which the sum of the 4 terms=0.

As discussed above, when probability distributions are generated for counts of types of log-file entries, there are often many 0-probability values in the distribution, since many types of events or error codes may not be observed within considered time intervals. For all of these cases, as well as cases in which one of the two probability distributions being compared has a 0 probability for event type i and the other probability distribution has a non-0 entry for event type i, no computation is involved for entries i in the two probability distributions. Thus, for example, when a first event-type probability distribution has non-0 values for odd event types and a second event-type probability distribution has non-0 entries for even event types, the Jensen-Shannon divergence can be seen, from expression (9), as having the value of 1.

FIGS. 19B-E show a C++ encoding of a method to compute the Jensen-Shannon divergence for two probability distributions, such as probability distributions corresponding to the probabilities of selected log-file entries of particular types or with particular error_code values from particular time intervals within a log file or virtual log file. FIG. 19B shows the header file. The header file includes a number of include statements on lines 1-3 (1920 in FIG. 19B), the definition of the constant "oneoverln2" on line 6 1921, the definition of an element type on lines 8-12 (1922 in FIG. 19B), the definition of a pointer type for the element type on line 15 (1924 in FIG. 19B), and a declaration for a class "distribution" that stores a probability distribution, on lines 19-34 (1925 in FIG. 19B). Each element in a distribution includes an index and a value, as declared on lines 10-11. In this way, sparse distributions can be represented by including only those elements with non-0 values. The class "distribution" includes the private data members declared on lines 22-25 and the public functions declared on lines 27-33. The data member num stores the number of elements in the distribution, the data member nxt stores a pointer to a next element in the distribution to fetch, using a call to the member function getNextElement call, and the data member elements is a pointer to an array of elements that represent the distribution. The public member functions include the function start, which starts fetching of elements of the distribution by returning a pointer to the first element of the distribution, and the member function getNextElement, which returns a pointer to a next element of the distribution, the member function getNextElement returning a null pointer when there are no additional elements in the distribution.

FIG. 19C shows implementations of the member functions start and getNextElement of the class distribution. The member function start returns a null pointer, on line 3, when there are no elements in the distribution and returns a pointer to the first element when there is at least one element in the distribution. The data member nxt is set to the next element, when there is more than one element in the distribution, and is otherwise set to the null pointer. The member function getNextElement returns the value of the data member nxt and sets the data member nxt to the next element in the distribution, when there is one, and otherwise sets the data member nxt to the null pointer. Additional member functions of the class distribution are provided in FIGS. 19C-D.

FIG. 19E shows implementation for a routine "Jensen_Shannon" that receives, as arguments, two probability distributions P and Q and returns the Jensen-Shannon divergence metric for the two distributions. Local variables include p and q, declared on lines 72-73 (1940 in FIG. 19E), log PQ, declared on line 75 (1942 in FIG. 19E), and four local variables that correspond to the summations within brackets in equation (9), provided above, declared on lines 77-80 (1944 in FIG. 19E): sumP log P+Q, sumQ log P+Q, sumP log P, and sumQ log Q.

On lines 82-83 (1946 in FIG. 19E), local variables p and q are set to the first elements in the distributions P and Q. When the two distributions P and Q are both empty, as determined on line 84 1948, then the routine "Jensen Shannon" returns the value 0 as the Jensen-Shannon divergence. Otherwise, the while-loop of lines 85-119 1950 continues to iterate until local variables p and q are both null. When both p and q are not null, and point to elements in the distributions P and Q, respectively, and when the index values of the two elements are identical, as determined on line 91, then the contents of all the summation variables declared on lines 77-80 are updated on lines 95-99. After updating of the summation variables, p and q are set to the next elements in the distributions P and Q, on lines 100-101. In all other cases, one of the two local variables p and q is updated to prepare for a next iteration of the while-loop. Finally, on lines 121-122, the routine "Jensen_Shannon" returns the Jensen-Shannon divergence metric for the distributions P and Q, computed according to equation (9), provided above.

As discussed above with reference to FIG. 17A, the two histograms 1702 and 1704 visually appear similar, and their Jensen-Shannon divergence value 0.0184 is relatively small. By contrast, the two distributions shown as histograms in FIG. 17B, 1710 and 1712, appear to be quite dissimilar, and their Jensen-Shannon divergence of 0.2721 is much larger than the Jensen-Shannon divergence value for distributions 1702 and 1704.

As mentioned above, computation of the Jensen-Shannon divergence is particularly efficient for sparse distributions that contain many 0 probabilities. In the case that one or both elements at a particular index contain 0 probabilities, only a single element pointer is updated. In the implementation illustrated in FIGS. 19B-E, the distributions are stored as arrays. However, the distributions may be furnished as element streams, by simple modification of the implementation shown in FIGS. 19B-E, to facilitate database-like query execution against voluminous probability distributions generated from large log files and virtual log files.

As mentioned above, a log-analytics application may compute the Jensen-Shannon divergence for pairs of probability distributions generated from subsets of log-file entries and display the divergence along with graphical histograms representing the distributions to a user in order to facilitate visual comparison of the states of a distributed computing system, reflected in log-file entries, for two different time periods. The Jensen-Shannon divergence metric provides a numerical value to assist a human user or to supplement the visual comparison of the histograms. However, the Jensen-Shannon divergence metric is particularly useful in facilitating automated comparisons of probability distributions generated from log-file entries used in a variety of different types of system components, devices, and analytics applications. The remaining discussion, below, is intended to provide examples of the many different uses that can be made of probability distributions generated from log-file entries and compared automatically using the Jensen-Shannon divergence metric.

Figure 20A:
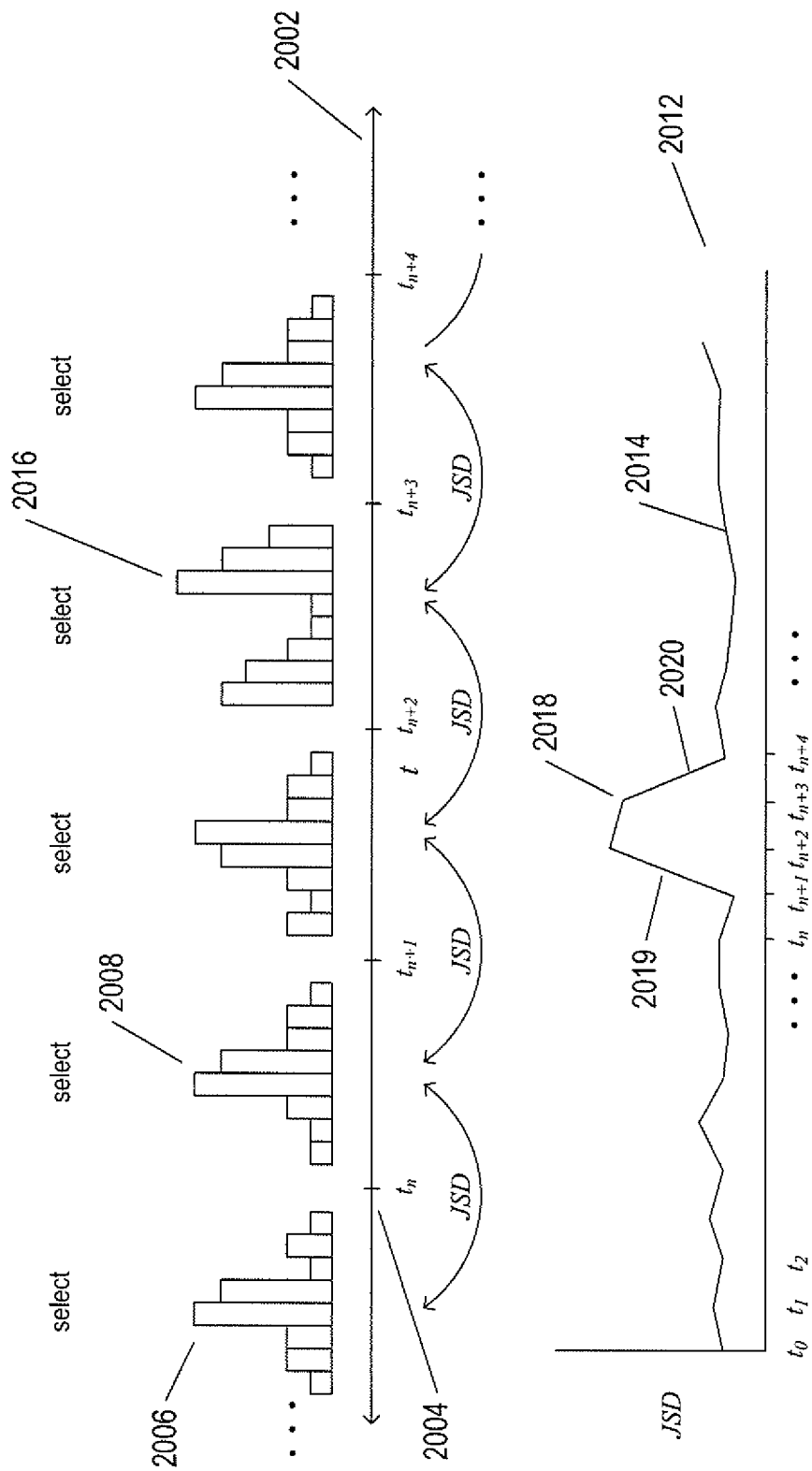
FIGS. 20A-D illustrate several applications of log-file-based probability distributions and comparison of probability distributions via the Jensen-Shannon divergence.

FIGS. 20A-D illustrate several applications of log-file-based probability distributions and comparison of probability distributions via the Jensen-Shannon divergence. FIG. 20A illustrates use of probability distributions in a monitoring subsystem that monitors the health of a distributed computing system. In FIG. 20A, a portion of a timeline 2002 is shown that includes five points in time, including point 2004, labeled $t_n$, $t_{n+1}$, $t_{n+3}$, $t_{n+3}$, and $t_{n+4}$. At each point in time, as represented by the histogram-like icons, such as histogram-like icon 2006, a SELECT statement with a "GROUP BY ERROR CODE" clause and additional constraints is used to generate a probability distribution for the different event types or error codes in log-file entries accumulated during the last time interval. Thus, for example, the probability distribution represented by histogram icon 2008 represents the error-code probability distribution for log-file entries accumulated between the time points $t_n$, and $t_{n+1}$. In addition, the monitoring subsystem computes pairwise Jensen-Shannon divergence metrics, as represented by curved arrows labeled "JSD," such as curved arrow 2010, between each adjacent computed probability distribution. A second plot 2012 in FIG. 20A shows the computed Jensen-Shannon-divergence-metric values at the monitoring time points. A continuous curve 2014 is shown, although the curve is generated by connecting discrete Jensen-Shannon-divergence-metric values at the time points used by the monitoring subsystem. As can be seen by visually comparing the histogram-like icons shown above the portion of the timeline 2002, the probability distribution for error codes in the log files for the monitoring time intervals are generally similar, with only small, incremental changes from one to the next, with the exception of the histogram-like icon 2016, which looks substantially different from the remaining histogram-like icons. This is reflected by the peak 2018 in plot 2012. There is a sharp rise in the Jensen-Shannon-divergence-metric value 2019 from $t_{n+1}$ to $t_{n+2}$ and a sharp decrease 2020 from $t_{n+3}$ to $t_{n+4}$. Peak 2018 indicates a rapid and significant change in the probability distribution computed from time points $t_{n+2}$ to $t_{n+3}$ versus the adjacent stretches of probability distributions for adjacent stretches of time intervals. Thus, peaks, such as peak 2018, represent flags or warning signals to the monitoring system with respect to abrupt and significant changes in the state of a distributed computing system as reflected in the probability distribution of event types or error codes within log files or virtual log files. The utility of the probability-distribution-based approach to monitoring the state of a distributed computing system is that the monitoring system does not need to carry out computationally complex and time-consuming analyses and pattern-matching exercises, and does not need to diagnose or detect particular state changes, but can instead rely on differences between successively computed probability distributions to detect system-state changes. In other words, the monitoring is based on an aggregate property of log files and virtual log files rather than on finding specific anomalies, inconsistencies, or problems represented by the log files. In many cases, peaks, such as peak 2018, may occur well in advance of deleterious downstream state transitions set in motion by initial, seemingly less-significant state changes. The probability-distribution-based monitoring thus provides a way to detect incipient problems long before deleterious downstream effects materialize.

Figure 20B:
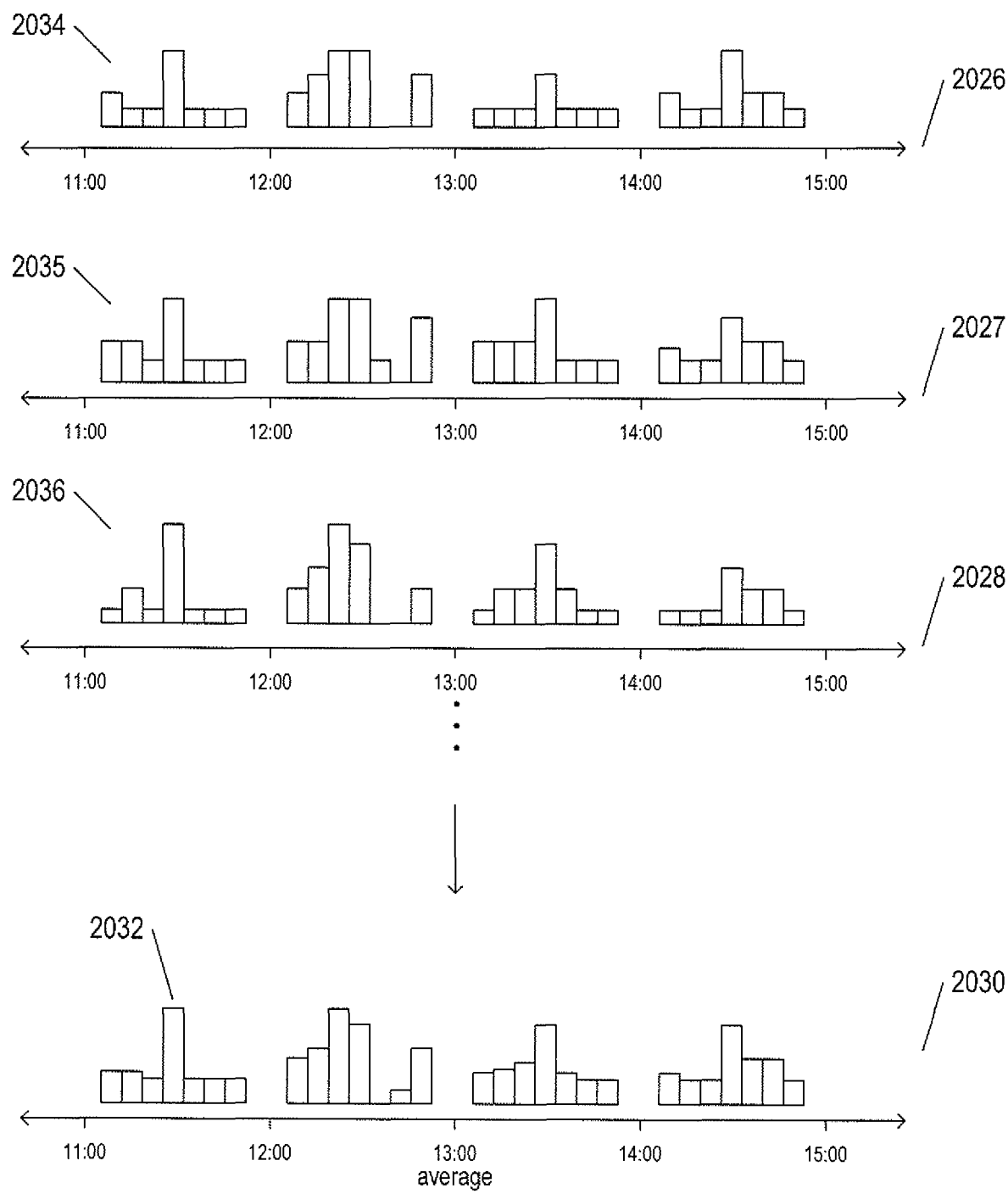
Figure 20C:
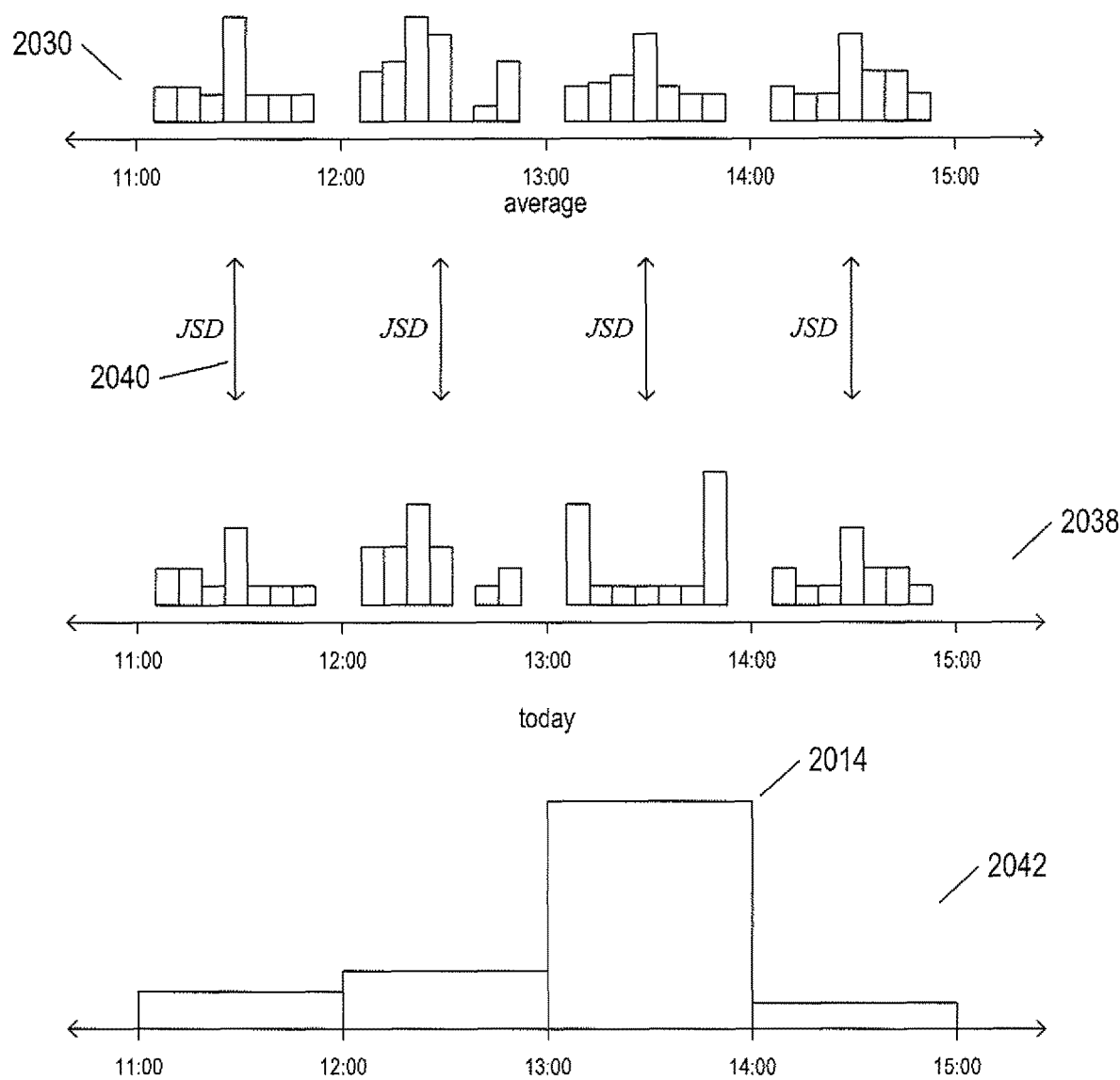

FIGS. 20B-C illustrate a different type of monitoring. As shown in FIG. 20B, historical log-file data can be used to generate probability distributions for relatively short time intervals within longer, repeating time intervals. In the example shown in FIG. 20B, the portions of timelines 2026-2028 represent midday periods on successive days. In this case, as can be seen by visually comparing the histogram-like icons shown above the portions of the timelines, the state of the distributed system may change substantially during successive hourly periods, but the states of the distributed computing system are relatively constant, for the same hourly time period, over successive days. Thus, the probability distributions reflect a relatively constant hourly variation in the state of the distributed computing system from one day to another. The historical data is used, as shown in FIG. 20B, to generate an average probability distribution for each short time interval 2030. Thus, for example, histogram-like icon 2032 represents an average probability distribution computed from the probability distributions represented by histogram-like icons 2034-2036.

As shown in FIG. 20C, a monitoring subsystem can use the average short-time-interval probability distributions 2030 as a base level to which to compare probability distributions computed for the current day 2038. The average historical probability distribution for each hour interval is compared to the recently computed probability distribution for the same hour interval on the current day using the Jensen-Shannon divergence metric, as indicated by vertical arrows, such as vertical arrow 2040. The computed Jensen-Shannon divergence metrics can then be plotted, in histogram-like fashion 2042. The tall peak 2044 in this distribution represents a significant departure of the state of the distributed computing system, as reflected in the log files or virtual log file, for the period between 1:00 pm and 2:00 pm of the current day, compared to the average state of the distributed computing system for that time period. Of course, many different short intervals and longer intervals can be monitored, by this method, to look for departures from normal or expected distributed-computer-system states.

Figure 20D:
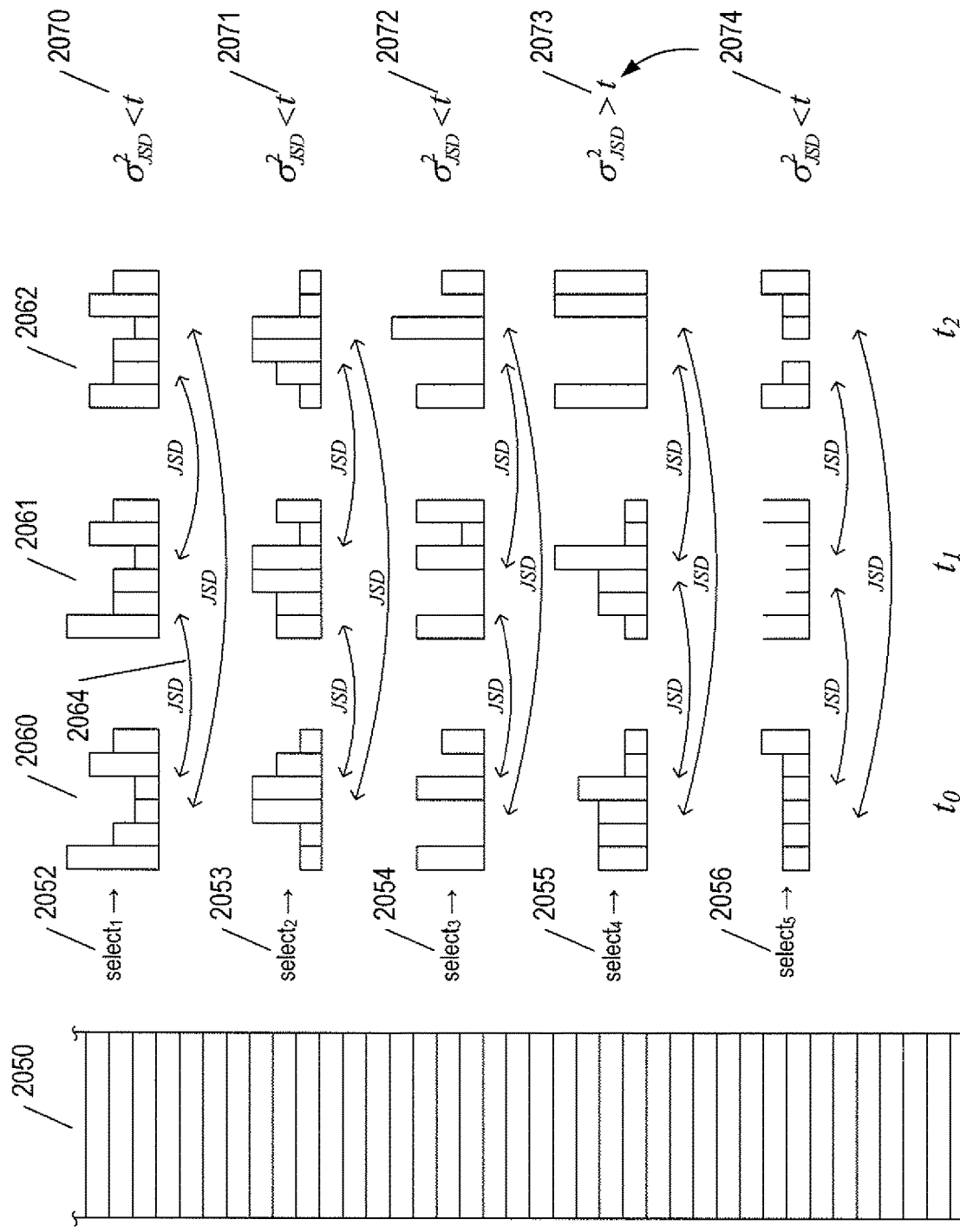

FIG. 20D shows yet another example of the use of the probability-distribution-based analysis of log-file entries. As discussed above, there may be thousands, tens of thousands, or more different event types or error-code values in log-file entries. In many cases, only a subset of these event types or error-code values may have significant predictive power for deleterious distributed-computing-system state changes. The Jensen-Shannon divergence metric can be used in order to select a best set of error-code values to use as a fingerprint, when calculating probability distributions from log-file entries, for monitoring purposes. In this case, a historical virtual log file 2050 may be employed. Different SELECT-statement templates, instances of which select log-file entries containing different subsets of error-code values 2052-2056 from the log file, are used as templates to generate, from the virtual log file 2050, probability distributions at successive intervals, such as the probability distributions 2060-2062 at three successive time intervals. Instances of each SELECT-statement template select log-file entries for particular time intervals. Then, pairwise Jensen-Shannon divergence metrics can be computed for all possible pairs of the computed probability distributions, as represented by curved arrows, such as curved arrow 2064. Finally, the variance $\sigma^2$ is computed for the Jensen-Shannon divergence metrics computed for the probability distributions generated from each different subset of error codes selected by the different SELECT-statement template instances. The variances 2070-2074 computed from the probability distributions generated by the SELECT-statement templates 2052-2056 thus reflect the variability in the probability distributions, over time, generated from log-file entries selected using instances of the SELECT-statement templates. These variances may be compared to a threshold t, with a variance that exceeds the threshold 2073 indicative of a potentially valuable error-code subset as a fingerprint for detecting distributed-computing-system state changes.

Figure 21:
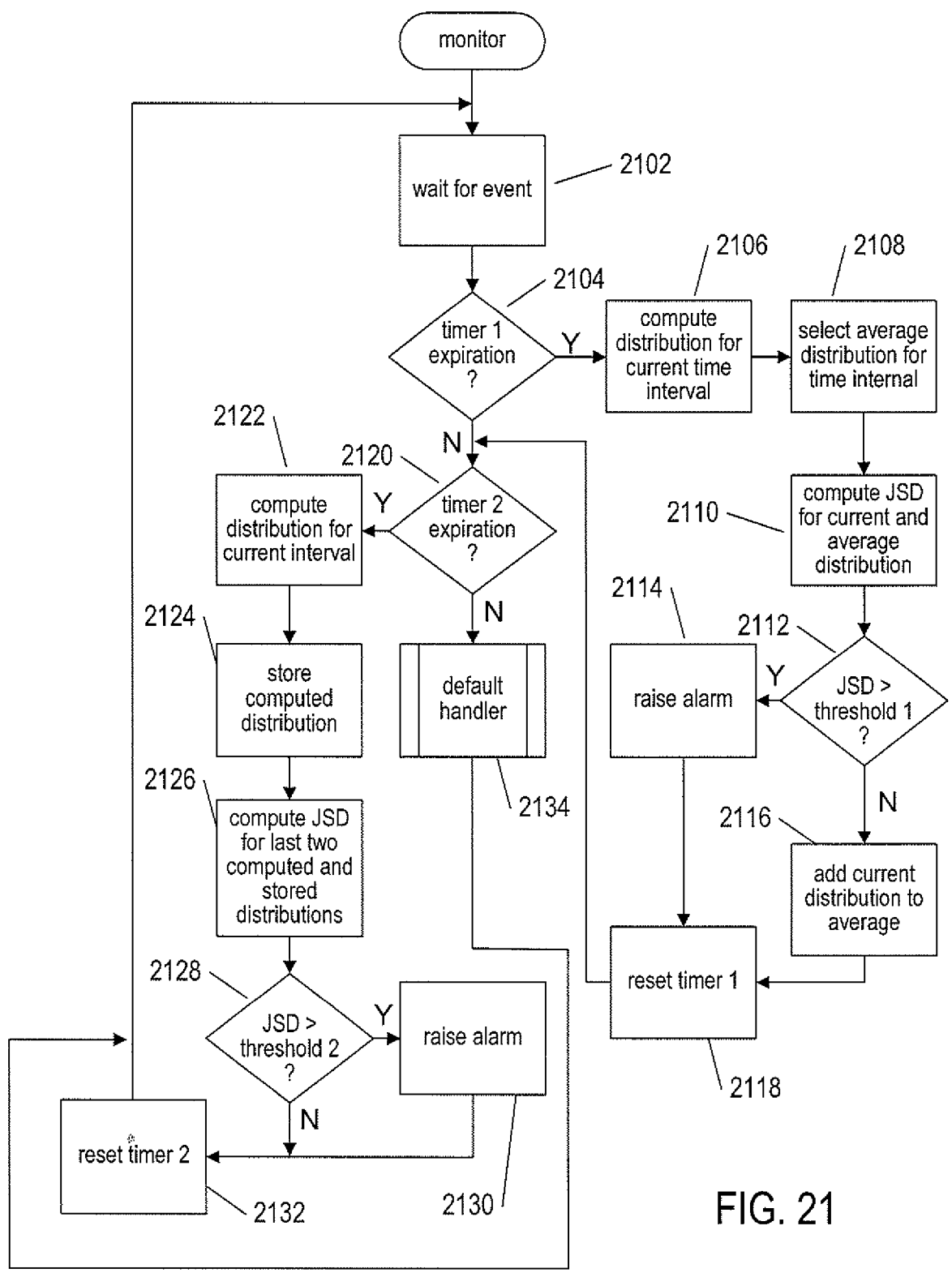
FIG. 21 provides a control-flow diagram for a monitoring subsystem within a distributed computing system.

FIG. 21 provides a control-flow diagram for a monitoring subsystem within a distributed computing system. The monitoring system runs as a continuous event-driven loop. In step 2102, the monitor waits for a next event to occur. When the next-occurring event is an expiration of a first timer, as determined in step 2104, which corresponds to a monitoring time interval for a monitoring scheme such as that shown in FIGS. 20B-C, the monitor computes a distribution for the current time interval, in step 2106, selects a corresponding average distribution for the time interval from previously computed averages, in step 2108, and computes the Jensen-Shannon divergence metric for the current and historical distributions for the current time interval in step 2110. When the computed Jensen-Shannon divergence metric is greater than a threshold value, as determined in step 2112, then an alarm is raised, in step 2114, to indicate a potential significant state change in a distributed computing system. Otherwise, the current distribution is added to the running average of probability distributions for the current time interval, in step 2116. The first timer is reset in step 2118 to complete handling of the timer expiration detected in step 2104. When expiration of a second timer has occurred, as determined in step 2120, which is a timer for a time interval used for a scheme such as that shown in FIG. 20A, the monitoring program computes a probability distribution for the current time interval, in step 2122, stores the computed distribution for subsequent reference in step 2124, and computes the Jensen-Shannon distribution for the distribution computed for the current interval and the previous computed distribution for the preceding interval in step 2126. When the computed Jensen-Shannon divergence metric is greater than a threshold value, as determined in step 2128, then an alarm is raised in step 2130. The second timer is reset in step 2132 to complete handling of the timer expiration detected in step 2120. When no timer expiration has occurred, then a default event handler is called in step 2134 to handle any other type of event that may trigger handling by the monitor. The alarms raised by the monitor may trigger additional components of the distributed computing system to more closely analyze log-file entries as well as other indicators of a system state in order to determine appropriate measures to take should significant anomalies or inconsistencies be detected.

Figure 22:
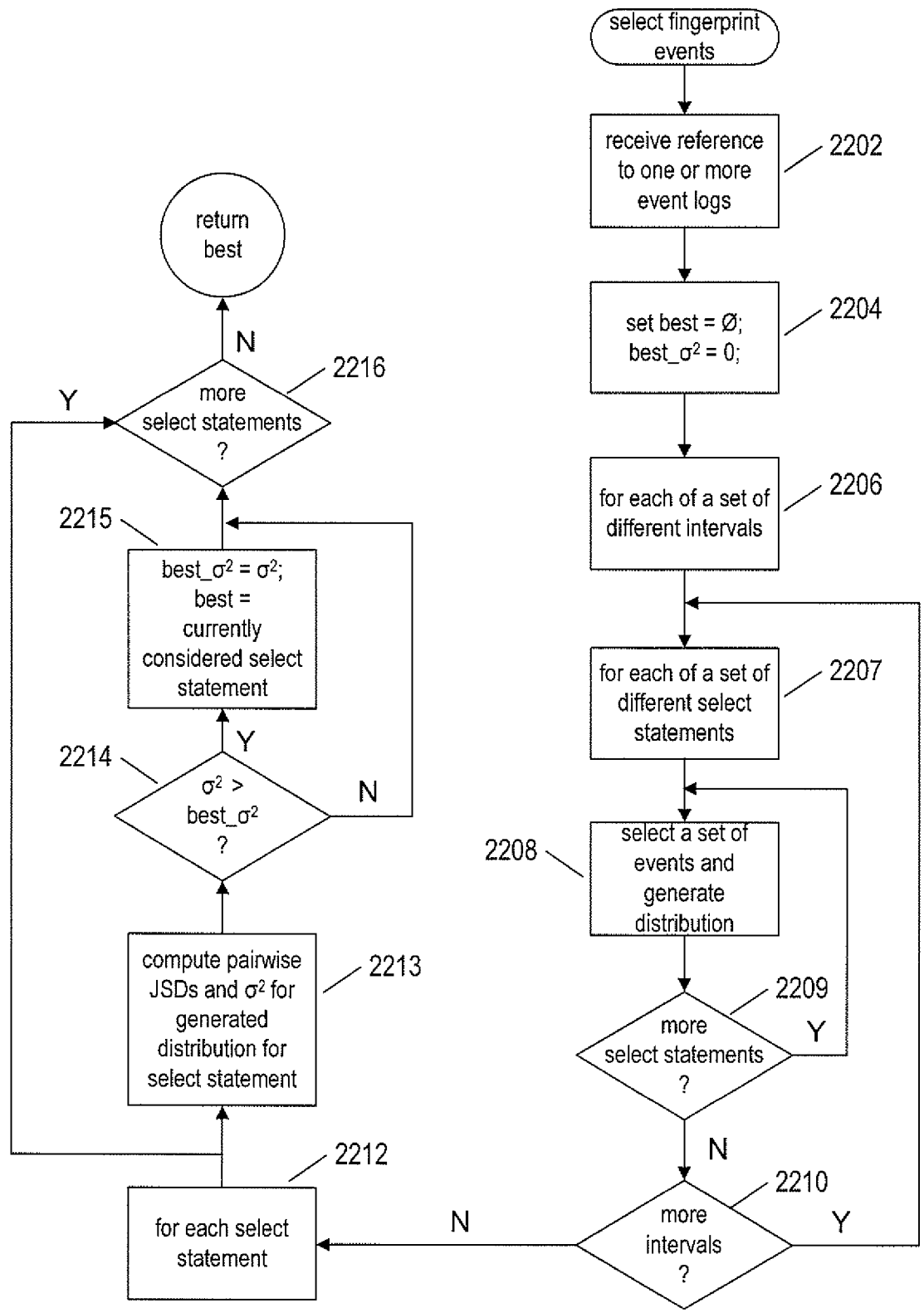
FIG. 22 illustrates a process for selecting promising subsets of error codes or event types to use to compute fingerprint probability distributions from log-file entries.

FIG. 22 illustrates a process for selecting promising subsets of error codes or event types to use to compute fingerprint probability distributions from log-file entries, as described above with reference to FIG. 20D. In step 2202, the routine receives a reference to one or more event logs. In step 2204, the local variable "best" is set to some null value and the local variable "best_$\sigma^2$" is set to 0. In the nested for-loops of steps 2206-2210, each of the SELECT-statement templates within a set of SELECT-statement templates is used to generate a succession of probability distributions for a succession of different time intervals. Then, in the for-loop of steps 2212-2216, pairwise Jensen-Shannon divergence metrics are computed for all possible pairs of probability distributions generated for a particular SELECT-statement template and the variance $\sigma^2$ for the computed Jensen-Shannon divergence metrics is computed, in step 2213. When the variance is greater than any variance so far computed, as determined in step 2214, then the currently considered SELECT-statement template is stored in local variable "best" and local variable "best $\sigma^2$" is set to the variance computed in step 2213. The SELECT-statement template with the largest variance is then returned by the routine.

Although the present invention has been described in terms of particular embodiments, it is not intended that the invention be limited to these embodiments. Modifications within the spirit of the invention will be apparent to those skilled in the art. For example, any of many different design and implementation parameters may be varied in order to generate alternative implementations of the above-discussed method, including hardware platform, operating system, virtualization method, modular organization, control structures, data structures, and other such parameters. While the Jensen-Shannon divergence metric is a compelling metric for comparing log-file-based probability distributions, other metrics may be used in alternative implementations. As discussed above, probability distributions of event types or error code values of log-file entries can be used for determining and monitoring the states of computer systems and distributed computer systems in a variety of different applications for a variety of different purposes. As discussed above, although many examples have been provided in which the measured divergence between probability distributions based on event-message types observed during particular time intervals is indicative of the difference between states of distributed computer systems during the particular time intervals, the divergence between probability distributions can be used as a comparison metric for any two subsets of log-file entries specified by two different queries.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. A log-file analysis subsystem within a computer system having one or more processors, one or more memories, and computer instructions, stored in one or more of the one or more memories that, when executed by one or more of the one or more processors, control the log-file analysis system to monitor a state of the computer system by repeatedly:
   generating, for one or more log files, each having multiple entries that are each associated with an event type, a probability distribution of all or a subset of the event types in the one or more log files for a time interval to represent the state of a monitored computer system for the time interval;
   storing the generated probability distribution in association with an indication of the time interval; and
   after generating and storing each probability distribution following generation and storing of an initial set of probability distributions,
   computing a divergence metric from the two most recently generated and stored probability distributions; distributions, and
   when the divergence metric is greater than a threshold value, raising an alarm to indicate, or displaying an indication of, a significant system-state change.

2. The log-file analysis subsystem of claim 1 wherein monitories the state of the computer system by the log-file analysis system further includes:
   using the stored probability distributions collected over a first time interval spanning multiple shorter, secondary time intervals to generate a typical probability distribution for each of a set of time intervals selected from the multiple shorter, secondary time intervals; and
   at subsequent secondary time intervals,
   generating a probability distribution for the event types of log entries selected from the most recently completed secondary time interval,
   computing a Jensen-Shannon divergence metric for the probability distribution generated from the most recently completed secondary time interval and the typical probability distribution for the most recently completed secondary time interval, and
   when the Jensen-Shannon divergence metric is greater than a threshold value, raising an alarm to indicate, or displaying an indication of, a system-state change.

3. The log-file analysis subsystem of claim 1 wherein monitoring the state of the computer system by the log-file analysis system further includes:
   for each of a number of different subsets of the event types for which the log-file analysis subsystem has generated and stored probability distributions for different time intervals,
   computing a Jensen-Shannon divergence metric for the probability distributions for different pairs of time intervals, and
   computing a measure of the variance of the Jensen-Shannon divergence metrics computed for the probability distributions for different pairs of the time intervals; and
   selecting, as a basis for a monitoring fingerprint, a subset of the event types having the greatest computed variance.

4. A method that monitors a state of a distributed computer system that includes multiple, network interconnected discrete computer systems, each having one or more processors, one or more memories, and one or more data-storage devices, one or more of the discrete computer systems including computer instructions, stored in one or more of the one or more memories of the discrete computer system, that, when executed by one or more of the one or more processors, control the discrete computer system to carry out the method comprising:
   repeatedly
   generating, for one or more log files, each having multiple entries that are each associated with an event type, a probability distribution of all or a subset of the event types in the one or more log files for a time interval to represent the state of a monitored computer system for the time interval,
   storing the generated probability distribution in association with an indication of the time interval in one or more of one or more memories and/or data-storage devices, and
   after generating and storing each probability distribution following generation and storing of an initial set of probability distributions,
   computing a divergence metric from the two most recently generated and stored probability distributions, and
   when the divergence metric is greater than a threshold value, raising an alarm to indicate, or displaying an indication of, a system-state change.

5. The method of claim 4 wherein the divergence metric is the Jensen-Shannon divergence metric.

6. The method of claim 4 further including:
   using the stored probability distributions collected over a first time interval spanning multiple shorter, secondary time intervals to generate a typical probability distribution for each of a set of time intervals selected from the multiple shorter, secondary time intervals; and
   at subsequent secondary time intervals,
   generating a probability distribution for the event types of log entries selected from the most recently completed secondary time interval,
   computing a divergence metric for the probability distribution generated from the most recently completed secondary time interval and the typical probability distribution for the most recently completed secondary time interval, and
   when the divergence metric is greater than a threshold value, raising an alarm to indicate, or displaying an indication of, a system-state change.

7. The method of claim 6 wherein the divergence metric is the Jensen-Shannon divergence metric.

8. The method of claim 4 further including:
for each of a number of different subsets of the event types for which the log-file analysis subsystem has generated and stored probability distributions for different time intervals,
computing a divergence metric for the probability distributions for different pairs of time intervals, and
computing a measure of the variance of the divergence metrics computed for the probability distributions for different pairs of the time intervals; and
selecting, as a basis for a monitoring fingerprint, a subset of the event types having the greatest computed variance.

9. The method of claim 8 wherein the divergence metric is the Jensen-Shannon divergence metric.

* * * * *